US011496948B2

(12) United States Patent
Novlan et al.

(10) Patent No.: US 11,496,948 B2
(45) Date of Patent: Nov. 8, 2022

(54) SYSTEM AND METHOD FOR AD-HOC/NETWORK ASSISTED DEVICE DISCOVERY PROTOCOL FOR DEVICE TO DEVICE COMMUNICATIONS

(71) Applicant: Samsung Electronics Co., LTD, Suwon-si (KR)

(72) Inventors: Thomas David Novlan, Dallas, TX (US); Young Han Nam, Plano, TX (US); Boon Loong Ng, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/054,544

(22) Filed: Oct. 15, 2013

(65) Prior Publication Data

US 2014/0112194 A1 Apr. 24, 2014

Related U.S. Application Data

(60) Provisional application No. 61/748,690, filed on Jan. 3, 2013, provisional application No. 61/716,330, filed on Oct. 19, 2012.

(51) Int. Cl.
*H04W 8/00* (2009.01)
*H04W 48/16* (2009.01)
*H04W 76/14* (2018.01)

(52) U.S. Cl.
CPC ........... *H04W 48/16* (2013.01); *H04W 8/005* (2013.01); *H04W 76/14* (2018.02)

(58) Field of Classification Search
CPC ................... H04W 76/043; H04W 4/005–008
See application file for complete search history.

(56) References Cited

U.S. PATENT DOCUMENTS

| 6,574,266 | B1 | 6/2003 | Haarsten |
| 2007/0201423 | A1 | 8/2007 | Laroia et al. |
| 2009/0010244 | A1 | 1/2009 | Laroia et al. |
| 2010/0110929 | A1 | 5/2010 | Li et al. |

(Continued)

FOREIGN PATENT DOCUMENTS

| CN | 1371583 A | 9/2002 |
| CN | 101371603 A | 2/2009 |

(Continued)

OTHER PUBLICATIONS

International Search Report dated Feb. 28, 2014 in connection with International Patent Application No. PCT/KR2013/009348, 3 pages.

(Continued)

*Primary Examiner* — Abdelillah Elmejjarmi

(57) ABSTRACT

A system and method for device to device (D2D) network-assisted device discovery are provided. The method includes initiating the D2D network-assisted device discovery of a receiving UE to enable a target UE and the receiving UE to establish a D2D communication. The method also includes performing a discovery feasibility measurement to determine whether a D2D communication between the target UE and the receiving UE is feasible. The method further includes transmitting a discovery setup message and receiving a discovery report from the target UE.

22 Claims, 11 Drawing Sheets

(56) References Cited

U.S. PATENT DOCUMENTS

| | | | |
|---|---|---|---|
| 2010/0165882 A1* | 7/2010 | Palanki | H04W 8/005 370/254 |
| 2010/0254308 A1 | 10/2010 | Laroia et al. | |
| 2010/0279672 A1* | 11/2010 | Koskela | H04W 36/30 455/418 |
| 2010/0291925 A1* | 11/2010 | Nagata | H04J 11/0069 455/434 |
| 2011/0258313 A1 | 10/2011 | Mallik et al. | |
| 2012/0011247 A1* | 1/2012 | Mallik | H04L 67/104 709/224 |
| 2012/0015607 A1 | 1/2012 | Koskela et al. | |
| 2012/0163235 A1* | 6/2012 | Ho | H04L 67/1061 370/254 |
| 2012/0243585 A1* | 9/2012 | Matsui | H04J 3/0658 375/219 |
| 2012/0258706 A1 | 10/2012 | Yu et al. | |
| 2013/0288668 A1 | 10/2013 | Pragada et al. | |
| 2013/0322388 A1* | 12/2013 | Ahn | H04W 76/023 370/329 |
| 2014/0056220 A1* | 2/2014 | Poitau | H04W 40/246 370/328 |
| 2014/0078952 A1* | 3/2014 | Bontu | H04W 76/023 370/312 |
| 2014/0099950 A1* | 4/2014 | Mildh | H04W 56/001 455/434 |
| 2014/0256334 A1* | 9/2014 | Kazmi | H04W 28/18 455/450 |
| 2014/0321314 A1* | 10/2014 | Fodor | H04W 72/085 370/252 |
| 2015/0063095 A1* | 3/2015 | Deng | H04W 24/04 370/221 |
| 2015/0341974 A1 | 11/2015 | Wu et al. | |
| 2016/0135121 A1 | 5/2016 | Takano | |
| 2017/0135055 A1* | 5/2017 | Seo | H04L 5/0048 |
| 2020/0028945 A1 | 1/2020 | Allen et al. | |

FOREIGN PATENT DOCUMENTS

| | | | |
|---|---|---|---|
| CN | 101689948 A | 3/2010 | |
| CN | 102204293 A | 9/2011 | |
| CN | 102265699 A | 11/2011 | |
| CN | 102369767 A | 3/2012 | |
| GB | 201202574 | 3/2012 | |
| GB | 2499411 A | 8/2013 | |
| WO | 2011131666 A1 | 10/2011 | |
| WO | 2011/161560 A1 | 12/2011 | |
| WO | WO2012091418 A2 * | 7/2012 | H04W 76/02 |
| WO | WO2013048296 A1 * | 4/2013 | H04W 72/04 |
| WO | WO2013089344 A1 * | 6/2013 | H04J 11/00 |

OTHER PUBLICATIONS

Written Opinion of International Searching Authority dated Feb. 28, 2014 in connection with International Patent Application No. PCT/KR2013/009348, 7 pages.
Gabor Fodor, et al.; "Design Aspects of Network Assisted Device-to-Device Communications"; Ericsson Research; IEEE Communicatins Magazine; May 2011; 8 pages.
Lei Lei, et al.; "Operator Controlled Device-to-Device Communications in LTE-Advanced Networks"; IEEE Wireless Communications; Jun. 2012; pp. 96-104.
Extended European Search Report dated Apr. 22, 2016 in connection with European Application No. 13847943.1, 9 pages.
Communication pursuant to Article 94(3) EPC dated Apr. 20, 2017 in connection with European Patent Application No. 13 847 943.1.
The First Office Action, dated Nov. 30, 2017, regarding Chinese Patent Application No. 201380061525.X, 17 pages.
European Search Report dated May 25, 2018 in connection with European Patent Application No. 18 17 0136.
European Patent Office Communication pursuant to Article 94(3) EPC dated Jan. 24, 2019 regarding Application No. 18170136.8, 6 pages.
Intellectual Property India—Examination Report dated Mar. 29, 2019 regarding Application No. 1086/KOLNP/2015, 5 pages.
European Search Report in connection with Application No. EP19217096.7 dated Jan. 16, 2020, 9 pages.
Notice of Patent Grant in connection with Korean Application No. 10-2015-7013167 dated Jan. 13, 2020, 4 pages.
First Office Action in connection with Chinese Application No. 201810950410.0 dated Jan. 6, 2021, 13 pages.
Vodafone, "Device to device communication for public safety and critical communications users," S1-122324, 3GPP TSG-SA WG1 #59, Chicago, USA, Jul. 30-Aug. 3, 2012, 5 pages.
Non-Final Office Action dated Jul. 9, 2021, in connection with U.S. Appl. No. 16/729,082, 9 pages.
Intellectual Property India, "Hearing Notice in Reference of Application No. 1086/KOLNP/2015" dated Aug. 16, 2021, 4 pages.
Patent Office of the Peoples Republic of China "Notification of Fulfilling of Registration Formality" dated Sep. 15, 2021, in connection with Chinese Patent Application No. CN201810950410.0, 7 pages.
"PeerRank: A Strategy for Resource Discovery in Unstructured P2P Systems" Journal of Software, vol. 17, No. 5, May 2006, 10 pages.
United States Patent and Trademark Office, Office Action dated Jul. 27, 2022 regarding co-pending U.S. Appl. No. 16/729,082, 15 pages.

* cited by examiner

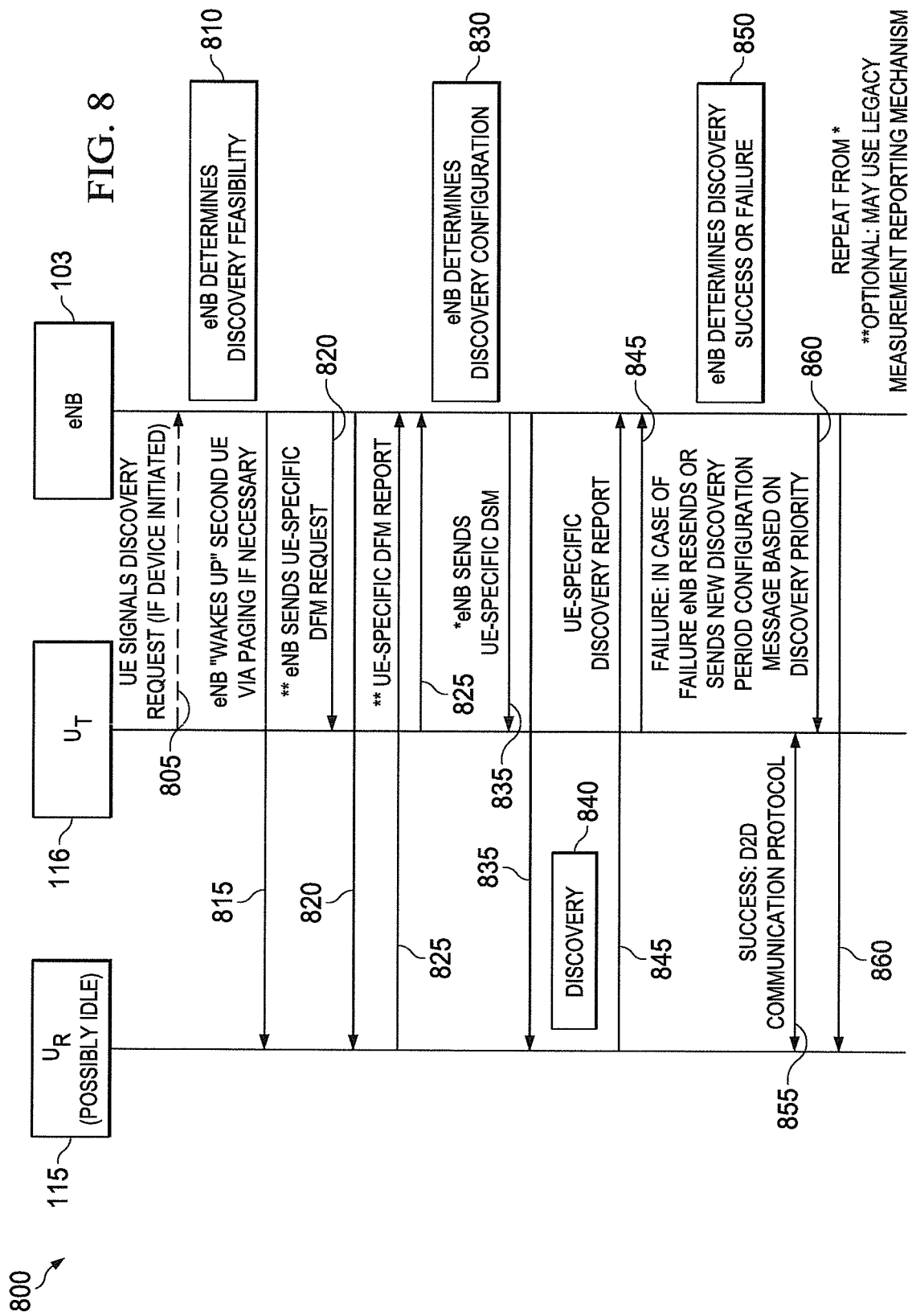

`US 11,496,948 B2`

SYSTEM AND METHOD FOR AD-HOC/NETWORK ASSISTED DEVICE DISCOVERY PROTOCOL FOR DEVICE TO DEVICE COMMUNICATIONS

CROSS-REFERENCE TO RELATED APPLICATION(S) AND CLAIM OF PRIORITY

The present application claims priority to U.S. Provisional Patent Application Ser. No. 61/716,330, filed Oct. 19, 2012, entitled "DEVICE DISCOVERY PROTOCOL FOR A DEVICE-TO-DEVICE COMMUNICATIONS SYSTEM" and U.S. Provisional Patent Application Ser. No. 61/748,690, filed Jan. 3, 2013, entitled "HYBRID AD-HOC/NETWORK-ASSISTED DEVICE DISCOVERY PROTOCOL FOR A DEVICE-TO-DEVICE COMMUNICATIONS SYSTEM." The content of the above-identified patent documents are incorporated herein by reference.

TECHNICAL FIELD

The present application relates generally to wireless communications and, more specifically, to ad-hoc/network assisted device discovery protocols for device to device communications.

BACKGROUND

Traditionally cellular networks have been designed to establish wireless communications links between mobile devices and fixed communication infrastructure (i.e., base stations or access points) which serve users in a wide or local geographic range. A wireless network however can also be implemented by only utilizing device-to-device (D2D) communication links. D2D communication enables two mobile devices in proximity of each other to establish a direct local link and to bypass the base station or access point. D2D communication may be used to implement many kinds of services that are complementary to the primary communication network or provide new services based on the flexibility of the network topology. For example future public safety networks are expected to require devices to operate in near simultaneous fashion when switching between infrastructure and ad-hoc modes.

SUMMARY

A user equipment (UE) is provided. The UE includes a plurality of antennas configured to communicate with at least one of an enhanced NodeB (eNB) via a cellular communication link and second user equipment via a device to device (D2D) communication, the D2D wireless communication comprising a direct wireless communication. The UE also includes processing circuitry coupled to the plurality of antennas, the processing circuitry configured to perform a network-assisted device discovery of the second user equipment, wherein the eNB assists in the UE in the network-assisted device discovery An enhanced NodeB (eNB) configured to communicate with a plurality of user equipments (UEs) is provided. The eNB includes a plurality of antennas configured to communicate with at least one UE. The eNB also includes processing circuitry coupled to the plurality of antennas, the processing circuitry configured to cause a target UE to perform a device-to-device (D2D) network-assisted device discovery of a receiving UE to enable the target UE and the receiving UE to establish a D2D communication A method for device to device (D2D) network-assisted device discovery is provided. The method includes initiating the D2D network-assisted device discovery of a receiving UE to enable a target UE and the receiving UE to establish a D2D communication. The method also includes performing a discovery feasibility measurement to determine whether a D2D communication between the target UE and the receiving UE is feasible. The method further includes transmitting a discovery setup message and receiving a discovery report from the target UE.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 illustrates a signaling flow for a device initiated network-assisted device discovery protocol according to embodiments of the present disclosure;

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

Figure 1:
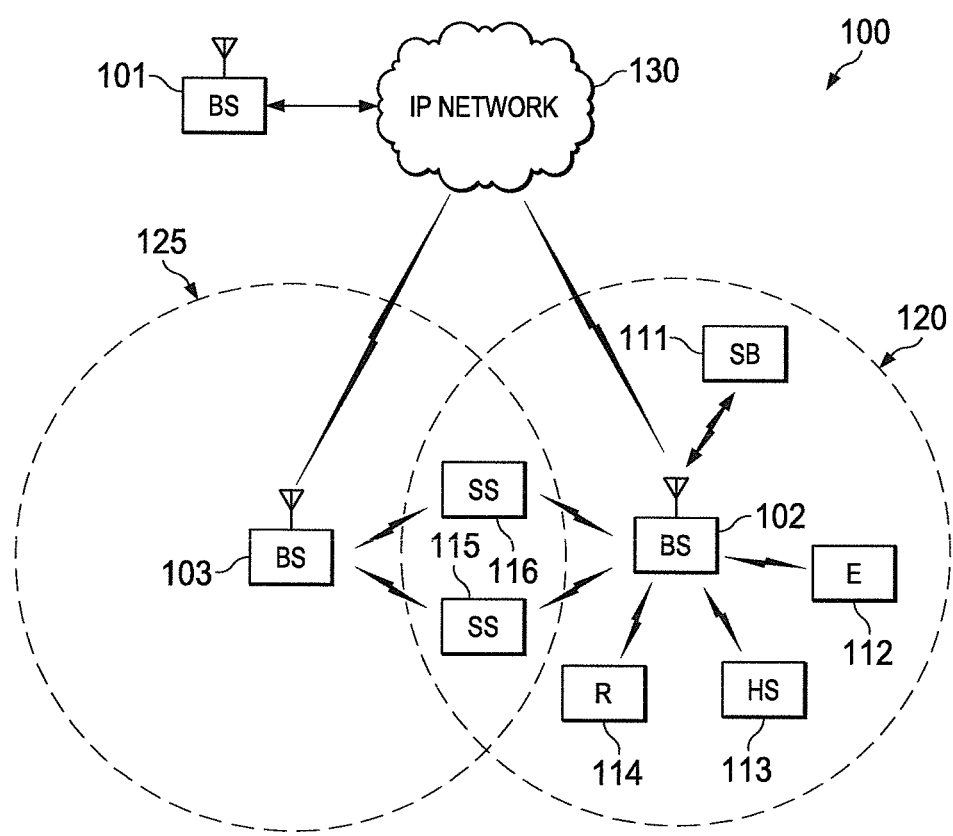
FIG. 1 illustrates a wireless network according to an embodiment of the present disclosure.

FIG. 1 illustrates a wireless network 100 according to one embodiment of the present disclosure. The embodiment of wireless network 100 illustrated in FIG. 1 is for illustration only. Other embodiments of wireless network 100 could be used without departing from the scope of this disclosure.

The wireless network 100 includes a base sta eNodeB (eNB) 101, eNB 102, and eNB 103. The eNB 101 communicates with eNB 102 and eNB 103. The eNB 101 also communicates with Internet protocol (IP) network 130, such as the Internet, a proprietary IP network, or other data network.

Depending on the network type, other well-known terms may be used instead of "eNodeB," such as "base station" or "access point". For the sake of convenience, the term "eNodeB" shall be used herein to refer to the network infrastructure components that provide wireless access to remote terminals. In addition, the term "user equipment" or "UE" is used herein to designate any remote wireless equipment that wirelessly accesses an eNB and that can be used by a consumer to access services via the wireless communications network, whether the UE is a mobile device (e.g., cell phone) or is normally considered a stationary device (e.g., desktop personal computer, vending machine, etc.). Other well know terms for the remote terminals include "mobile stations" (MS) and "subscriber stations" (SS), "remote terminal" (RT), "wireless terminal" (WT), and the like.

The eNB 102 provides wireless broadband access to network 130 to a first plurality of user equipments (UEs) within coverage area 120 of eNB 102. The first plurality of UEs includes UE 111, which may be located in a small business; UE 112, which may be located in an enterprise; UE 113, which may be located in a WiFi hotspot; UE 114, which may be located in a first residence; UE 115, which may be located in a second residence; and UE 116, which may be a mobile device, such as a cell phone, a wireless laptop, a wireless PDA, or the like.

The eNB 103 provides wireless broadband access to a second plurality of UEs within coverage area 125 of eNB 103. The second plurality of UEs includes UE 115 and UE 116. In some embodiments, one or more of eNBs 101-103 may communicate with each other and with UEs 111-116 using 5G, LTE, LTE-A, or WiMAX techniques including techniques for: hybrid ad-hoc/network assisted device discovery for device to device communications.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Although FIG. 1 depicts one example of a wireless network 100, various changes may be made to FIG. 1. For example, another type of data network, such as a wired network, may be substituted for wireless network 100. In a wired network, network terminals may replace eNBs 101-103 and UEs 111-116. Wired connections may replace the wireless connections depicted in FIG. 1.

Figure 2A:
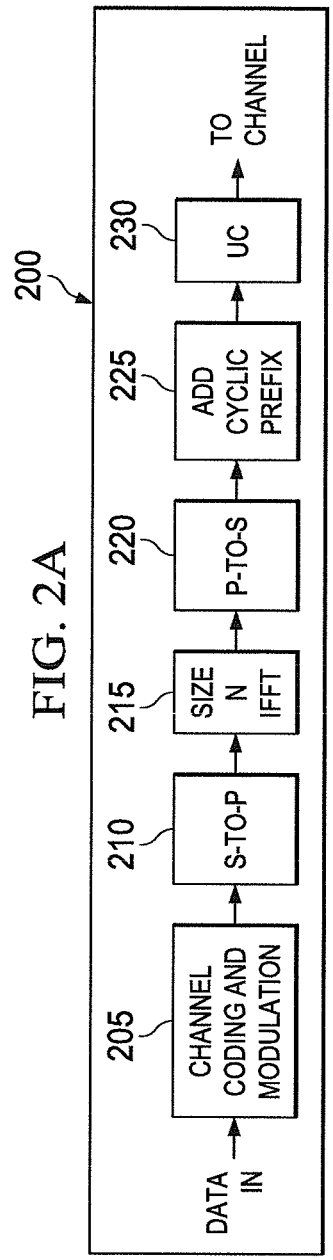
FIG. 2A illustrates a high-level diagram of a wireless transmit path according to an embodiment of this disclosure.
Figure 2B:
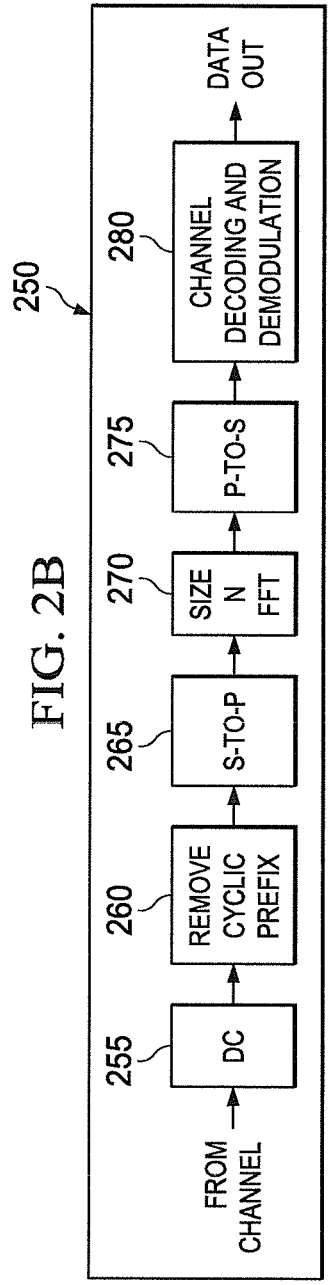
FIG. 2B illustrates a high-level diagram of a wireless receive path according to an embodiment of this disclosure.

FIG. 2A is a high-level diagram of a wireless transmit path. FIG. 2B is a high-level diagram of a wireless receive path. In FIGS. 2A and 2B, the transmit path 200 may be implemented, e.g., in eNB 102 and the receive path 250 may be implemented, e.g., in a UE, such as UE 116 of FIG. 1. It will be understood, however, that the receive path 250 could be implemented in an eNB (e.g. eNB 102 of FIG. 1) and the transmit path 200 could be implemented in a UE. In certain embodiments, transmit path 200 and receive path 250 are configured to perform methods for hybrid ad-hoc/network assisted device discovery for device to device communications as described in embodiments of the present disclosure.

Transmit path 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. Receive path 250 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2A and 2B may be implemented in software while other components may be implemented by configurable hardware (e.g., a processor) or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in eNB 102 and UE 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at UE 116 after passing through the wireless channel and reverse operations to those at eNB 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of eNBs 101-103 may implement a transmit path that is analogous to transmitting in the downlink to UEs 111-116 and may implement a receive path that is analogous to receiving in the uplink from UEs 111-116. Similarly, each one of UEs 111-116 may implement a transmit path corresponding to the architecture for transmitting in the uplink to eNBs 101-103 and may implement a receive path corresponding to the architecture for receiving in the downlink from eNBs 101-103.

Figure 3:
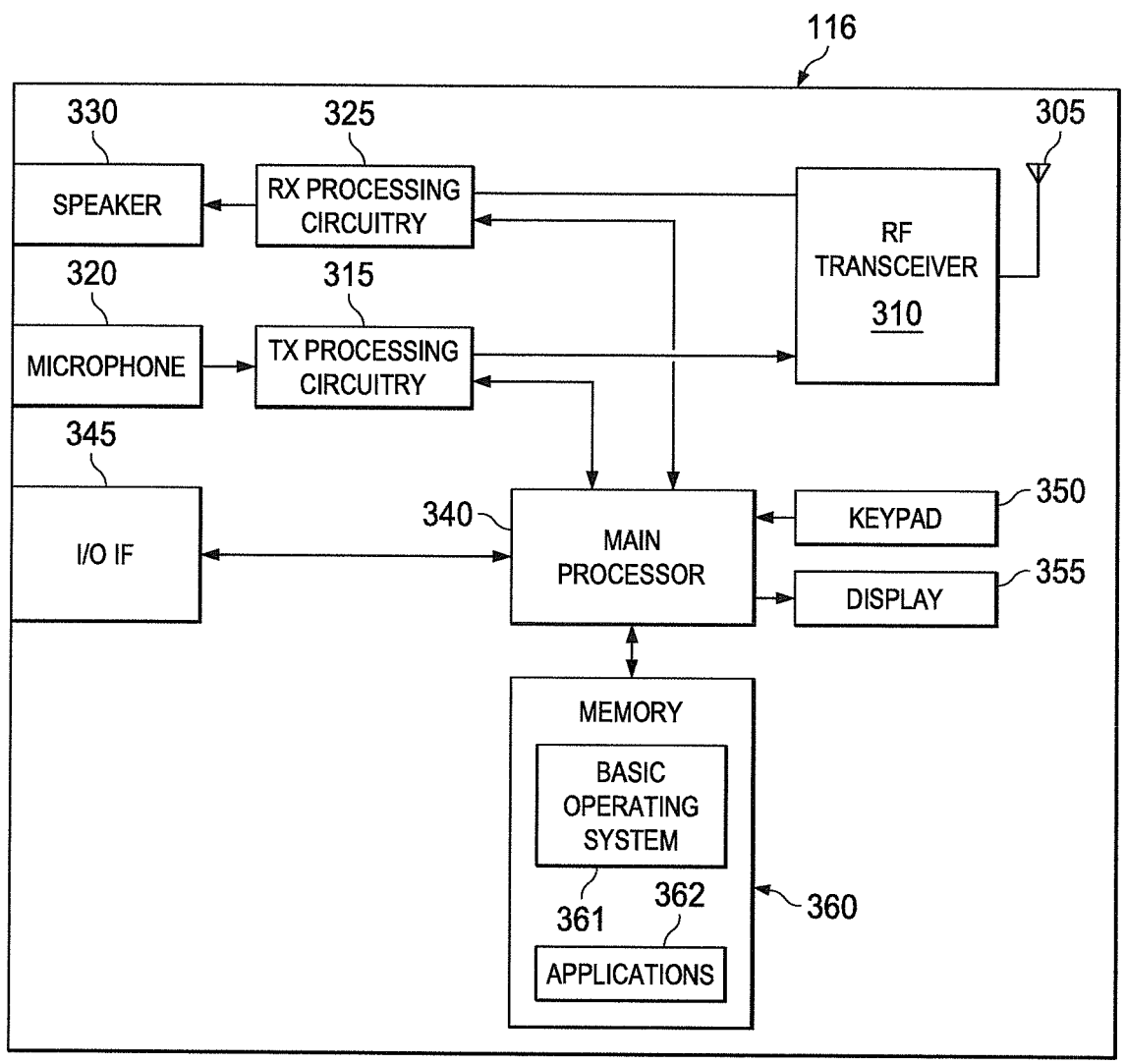
FIG. 3 illustrates a subscriber station according to an exemplary embodiment of the disclosure.

FIG. 3 illustrates a subscriber station according to embodiments of the present disclosure. The embodiment of subscribe station, such as UE 116, illustrated in FIG. 3 is for illustration only. Other embodiments of the wireless subscriber station could be used without departing from the scope of this disclosure.

UE 116 comprises antenna 305, radio frequency (RF) transceiver 310, transmit (TX) processing circuitry 315, microphone 320, and receive (RX) processing circuitry 325. Although shown as a single antenna, antenna 305 can include multiple antennas. SS 116 also comprises speaker 330, main processor 340, input/output (I/O) interface (IF) 345, keypad 350, display 355, and memory 360. Memory 360 further comprises basic operating system (OS) program 361 and a plurality of applications 362. The plurality of applications can include one or more of resource mapping tables (Tables 1-10 described in further detail herein below).

Radio frequency (RF) transceiver 310 receives from antenna 305 an incoming RF signal transmitted by a base station of wireless network 100. Radio frequency (RF) transceiver 310 down-converts the incoming RF signal to produce an intermediate frequency (IF) or a baseband signal. The IF or baseband signal is sent to receiver (RX) processing circuitry 325 that produces a processed baseband signal by filtering, decoding, and/or digitizing the baseband or IF signal. Receiver (RX) processing circuitry 325 transmits the processed baseband signal to speaker 330 (i.e., voice data) or to main processor 340 for further processing (e.g., web browsing).

Transmitter (TX) processing circuitry 315 receives analog or digital voice data from microphone 320 or other outgoing baseband data (e.g., web data, e-mail, interactive video game data) from main processor 340. Transmitter (TX) processing circuitry 315 encodes, multiplexes, and/or digitizes the outgoing baseband data to produce a processed baseband or IF signal. Radio frequency (RF) transceiver 310 receives the outgoing processed baseband or IF signal from transmitter (TX) processing circuitry 315. Radio frequency (RF) transceiver 310 up-converts the baseband or IF signal to a radio frequency (RF) signal that is transmitted via antenna 305.

In certain embodiments, main processor 340 is a microprocessor or microcontroller. Memory 360 is coupled to main processor 340. According to some embodiments of the present disclosure, part of memory 360 comprises a random access memory (RAM) and another part of memory 360 comprises a Flash memory, which acts as a read-only memory (ROM).

Main processor 340 executes basic operating system (OS) program 361 stored in memory 360 in order to control the overall operation of wireless subscriber station 116. In one such operation, main processor 340 controls the reception of forward channel signals and the transmission of reverse channel signals by radio frequency (RF) transceiver 310, receiver (RX) processing circuitry 325, and transmitter (TX) processing circuitry 315, in accordance with well-known principles.

Main processor 340 is capable of executing other processes and programs resident in memory 360, such as operations for hybrid ad-hoc/network assisted device discovery for device to device communications as disclosed in embodiments of the present disclosure. Main processor 340 can move data into or out of memory 360, as required by an executing process. In some embodiments, the main processor 340 is configured to execute a plurality of applications 362, such as applications for CoMP communications and MU-MIMO communications. The main processor 340 can operate the plurality of applications 362 based on OS program 361 or in response to a signal received from BS 102. Main processor 340 is also coupled to I/O interface 345. I/O interface 345 provides subscriber station 116 with the ability to connect to other devices such as laptop computers and handheld computers. I/O interface 345 is the communication path between these accessories and main controller 340.

Main processor 340 is also coupled to keypad 350 and display unit 355. The operator of subscriber station 116 uses keypad 350 to enter data into subscriber station 116. Display 355 may be a liquid crystal display capable of rendering text and/or at least limited graphics from web sites. Alternate embodiments may use other types of displays.

Figure 4A:
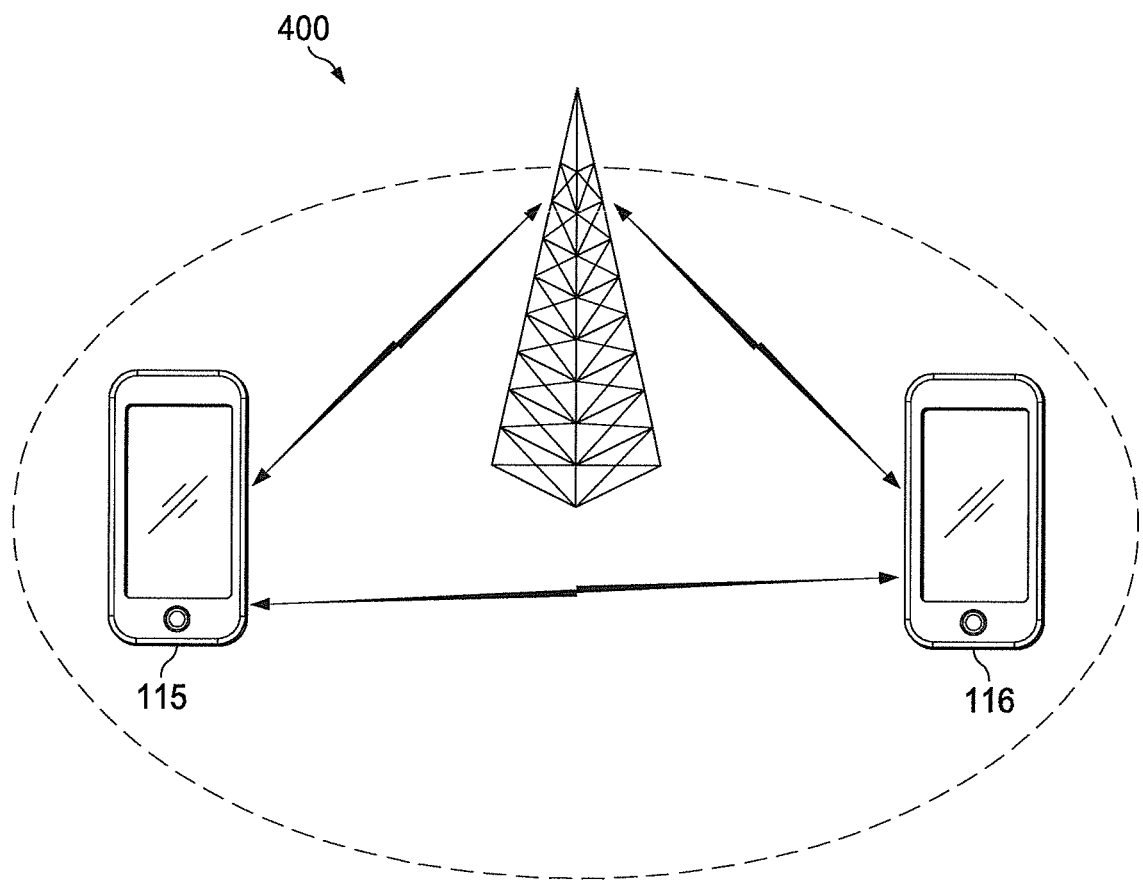
FIG. 4A illustrates a hybrid network according to embodiments of the present disclosure.
Figure 4B:
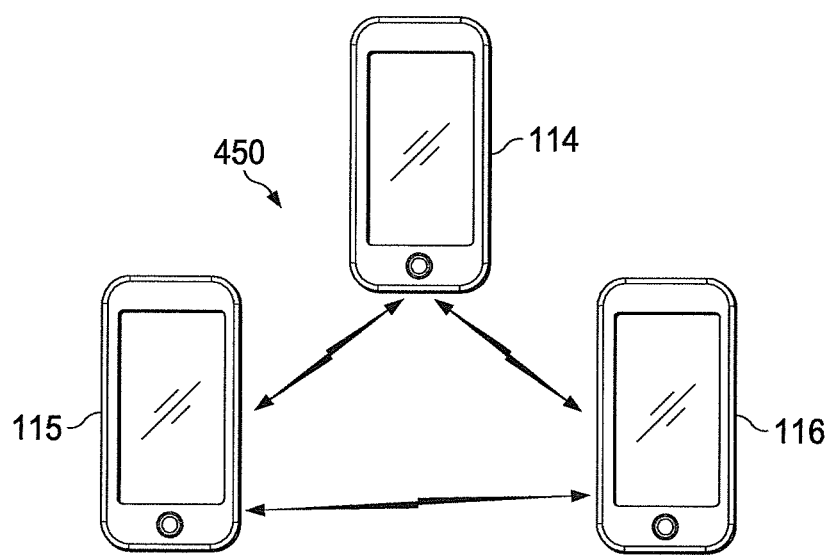
FIG. 4B illustrates an ad-hoc network according to embodiments of the present disclosure.

FIG. 4A illustrates a hybrid network according to embodiments of the present disclosure. FIG. 4B illustrates an ad-hoc network according to embodiments of the present disclosure. The embodiments of the hybrid network 400 and the ad-hoc network 450 shown in FIGS. 4A and 4B are for illustration only. Other embodiments could be used without departing from the scope of the present disclosure.

A wireless network however can also be implemented by only utilizing device-to-device (D2D) communication links without the need for deployed access points and is typically referred to as an ad-hoc network. The hybrid communication network can support devices, such as UE 114, UE 115 and UE 116, which can connect both to access points (AP) 405 (infrastructure mode) and other D2D-enabled devices. AP 405 can be an eNodeB, such as eNB 101, eNB 102 and eNB 103, or AP 405 can be a wireless hotspot, femtocell, microcell, other the like. Additionally, UE 114, UE 115 and UE 116 are capable of establishing a direct connection. That is, UE 114, UE 115 and UE 116 are each capable of establishing a direct communication link for with each other without routing communications through an access point or router. D2D communication may either be network-controlled where the operator manages the switching between direct and conventional cellular links, or the direct links may be managed by the devices without operator control. D2D allows combining infrastructure-mode and ad hoc communication.

Generally, device discovery is needed periodically. Further, D2D devices, such as UE 114, UE 115 and UE 116, utilize a discovery message signaling protocol to perform device discovery. For example, UE 116 a device can transmit its discovery message and UE 114 receives this discovery message and can use the information to establish a communication link. An advantage of a hybrid network 400 is that if devices are also in communication range of network infrastructure, APs 405 can additionally assist in the transmission or configuration of discovery messages. Coordination/control by the access points in the transmission or configuration of discovery messages is also important to ensure that D2D messaging does not create interference to the normal operation of the access points with the devices connected to the access points. Additionally, even if some of the devices are outside of the network coverage range, in-coverage devices can assist in the ad-hoc discovery protocol.

Embodiments of the present disclosure provide methods for performing device discovery within the scope of a hybrid LTE-Advanced cellular network comprising base stations (eNBs) and user equipment devices (UEs), wherein the UEs have the ability to communicate with the network and each other via UE to eNB and UE to UE links respectively. The network assists in the device discovery process through an iterative protocol involving control messaging, link quality measurement, and discovery messaging between the UEs and the network and the respective UEs.

Additionally, the varying nature of the radio propagation environment implies that the device discovery protocol may have different probabilities of failure depending on the network scenario. For certain use cases, such as public safety, device discovery may be more critical to ensure than certain consumer oriented use cases. As a result, embodiments of the present disclosure provide for a discovery priority wherein different resource configurations (bandwidth, transmit power, discovery length) are mapped to different priority levels that can be configured by the network or device.

The discovery process can be initiated by the device, such as UE 114, UE 115 and UE 116. Additionally, the network (including the eNB, such as eNB 101, eNB 102 or eNB 103, or higher level core network source) can initiate the discovery process.

Certain embodiments of the present disclosure provide for the network to initiate device discovery in response to eNB 102 determining (or attempting to determine) whether a first UE and a second UE are within range of a direct D2D communication link. Embodiments of the present disclosure provide benefits in terms of latency, throughput, or reducing network congestion for the UEs to utilize a D2D link rather than routing their communication through the cellular UE-eNB links.

Certain embodiments of the present disclosure provide for a network-initiated device discovery when the network requires for a UE 116 to transmit data directly to UE 115 over a D2D link. An exemplary situation may be a public safety communication network utilized by first responders. Telemetry (video, positioning, or application data) for example may be shared between the UE 116 and UE 115. Even though both devices are within range of eNB 102, the D2D link may be preferred due to latency or link reliability concerns and session quality and continuity (if the devices remain close to each other but may move in and out of the network coverage) are often very important criteria for public safety networks.

Figure 5:
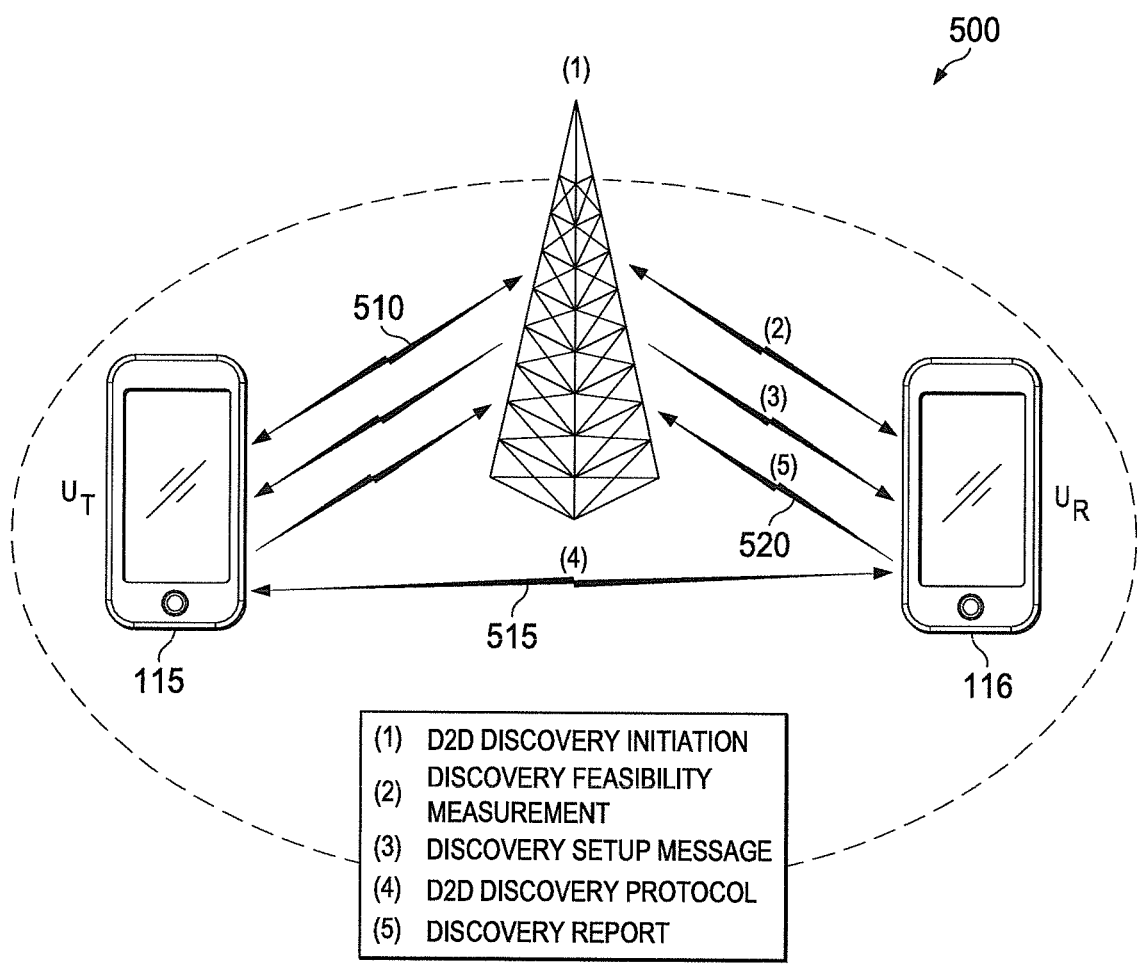
FIG. 5 illustrates a network-initiated network assisted device discovery according to embodiments of the present disclosure.

FIG. 5 illustrates a network-initiated network assisted device discovery according to embodiments of the present disclosure. The embodiment of the network-initiated network assisted device discovery 500 shown in FIG. 5 is for illustration only. Other embodiments could be used without departing from the scope of the present disclosure.

In certain embodiments, in a network assisted device discovery, the devices to engage in D2D communication are all within the communication range of the network and the network (for example the eNB) initiates the discovery protocol. In the example shown in FIG. 5, eNB 102 and two D2D enabled UEs, UE 116 and UE 115 are within communication range. Although two UEs are only considered, the following description could be generalized to consider discovery between a plurality of UEs. The discovery protocol is divided into five main steps: 1. D2D discovery initiation; 2. discovery feasibility measurement 505; 3. discovery resource configuration and signaling 510; 4. D2D discovery protocol 515; and 5. discovery report messaging 520 in the case of discovery success or failure.

Figure 6:
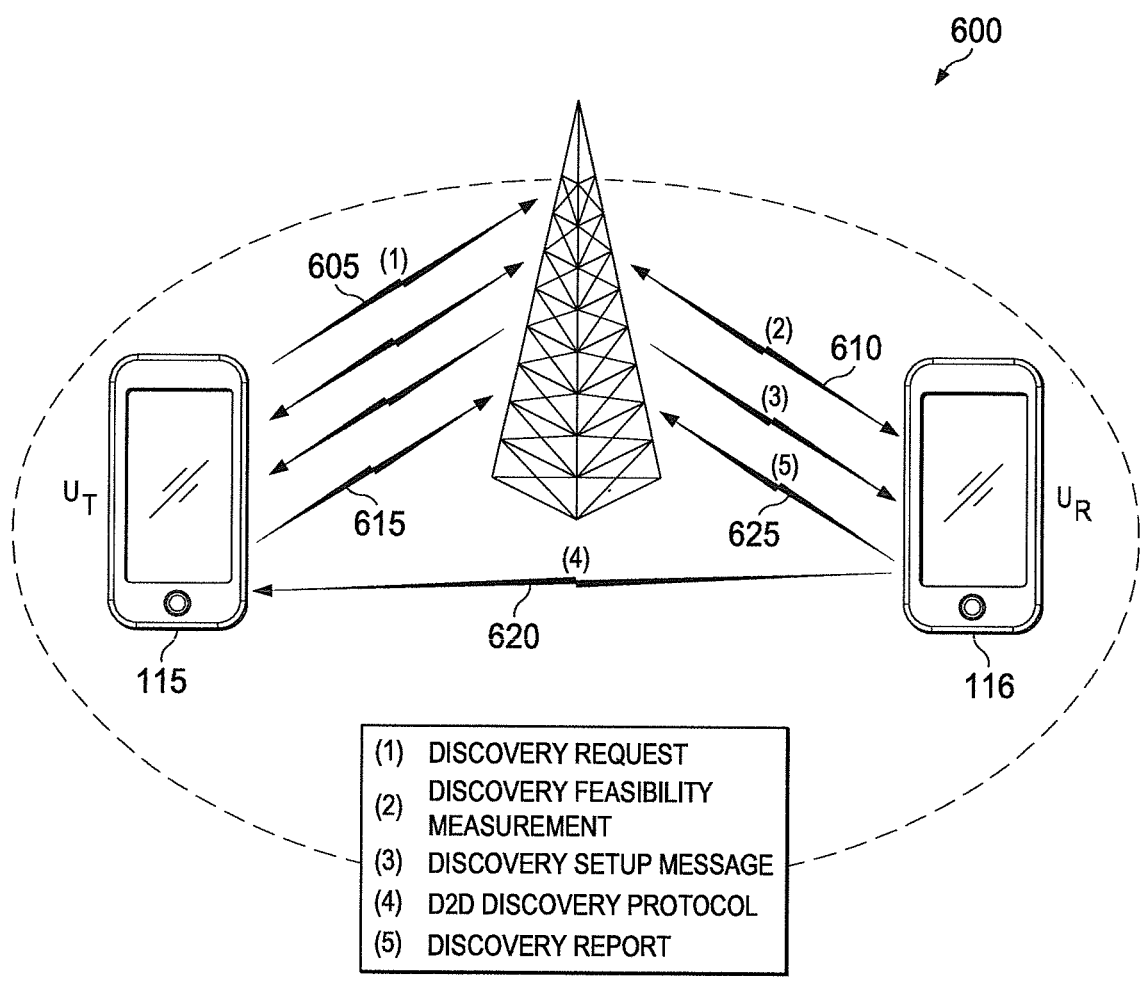
FIG. 6 illustrates a device initiated network-assisted device discovery according to embodiments of the present disclosure.

FIG. 6 illustrates a device initiated network-assisted device discovery according to embodiments of the present disclosure. The embodiment of the device initiated network-assisted device discovery 600 shown in FIG. 6 is for illustration only. Other embodiments could be used without departing from the scope of the present disclosure.

In the case of device-initiated discovery, UE 116 (i.e., the operator of UE 116) would like to determine if UE 116 is within range a specific UE, such as UE 115, with which UE 116 would like to initiate a D2D communication link. Alternatively UE 116 can determine which UEs are within D2D communication range and use that information to later determine whether a data communication link should be established with one or more of the UEs that is in range. Since the network is not initially aware of the desire by UE 116 to setup a discovery period, the protocol enables UE 116 to indicate this on-demand via an uplink control channel message.

In certain embodiments of the network assisted device discovery, the devices to engage in D2D communication are all within the communication range of the network (such as eNB 103) and UE 116 initiates the discovery protocol. In the example shown in FIG. 6, eNB 103 and two D2D enabled UEs, UE 116 (e.g., $U_T$) and UE 115 (e.g., $U_R$) are within communication range. Although two UEs are only considered, embodiments of the present disclosure can be generalized to consider discovery between a plurality of UEs. The discovery protocol is divided into five main steps: 1. discovery request 605; 2. discovery feasibility measurement 610; 3. discovery resource configuration and signaling 615; 4. D2D discovery protocol 620; and 5. discovery report messaging 625.

Figure 7:
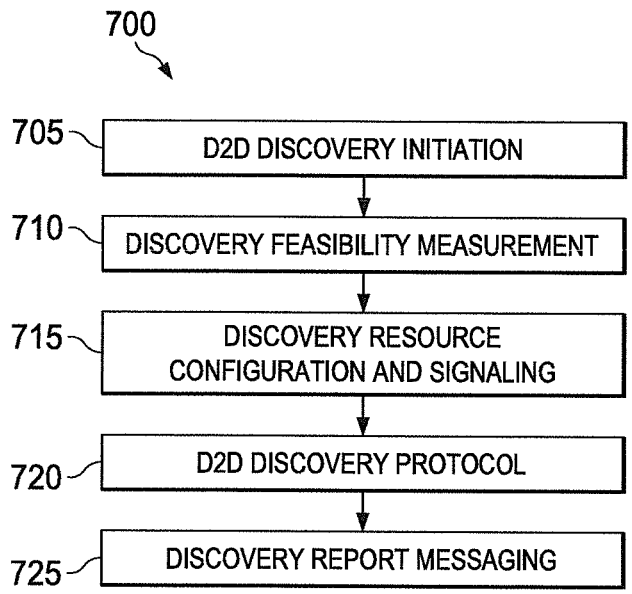
FIG. 7 illustrates a discovery protocol according to embodiments of the present disclosure.

FIG. 7 illustrates a discovery protocol according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, an eNB or a UE.

In block 705, the D2D discovery is initiated. For example, in a network initiated discovery protocol, eNB 103 initiates D2D discovery initiation, such as in step 1 of FIG. 5. In certain embodiments, the determination by eNB 103 to configure D2D is based on eNB 103 receiving an indication of data to be transmitted from UE 116 (e.g., $U_T$) and UE 115 (e.g., $U_R$). A data indication message can be created by:

a) UE 116 wherein UE 116 indicates to the eNB 103 via a buffer status report (BSR) sent on the Uplink Shared Channel (UL-SCH);

b) UE 116 wherein UE 116 indicates to the eNB 103 via a scheduling request (SR) sent on the PUCCH;

c) UE 116 wherein UE 116 indicates to the eNB 103 via a SR sent on the Random Access Channel (RACH); and d) eNB 103, or another core network source, indicating that UE 116 is intended to establish a D2D link with UE 115 and indicates to the network by higher layer signaling.

When UE 116 creates the data indication message (e.g., in alternatives a)-c) above), the network determines that the intended source of the data to be transmitted by UE 116 corresponding to the scheduling request is UE 115. Once UE 115 is determined to be in the range of eNB 103 (i.e., when both $U_T$ and $U_R$ are in range of the same eNB), eNB 103 uses an RRC connection status, or another available UE tracking database, to determine a feasibility and configuration of D2D discovery with UE 116.

In certain embodiments in a network initiated discovery protocol when e NB 103 initiates D2D discovery initiation (such as in step 1 of FIG. 5), the determination is based on a discovery trigger wherein eNB 103 requests devices to engage in D2D discovery on a periodic or aperiodic basis. The discovery trigger can be a timer or the discovery trigger can be event based. For example, eNB 103 can initiate D2D discovery on a periodic or aperiodic basis in order to update a D2D device database at eNB 103 regarding the status and proximity of devices in the network. The D2D device database can be stored in eNB 103, such as in a memory in eNB 103. The base station, e.g., eNB 103, can use the D2D device database to determine the feasibility of D2D discovery and/or communication.

When eNB 103 requests devices to engage in D2D discovery on a periodic basis, eNB 103 initiates a periodic discovery trigger. The value of the periodic discovery trigger is configured by the network and indicates the period between device discovery periods, such as in terms of time units or subframes. In certain embodiments, the value of the periodic discovery trigger is explicitly indicated to UE 116 via an RRC configuration message. UE 116 is expected to receive a discovery feasibility message 505 from eNB 103 in block 710, such as step 2 in FIG. 5, at the time or subframe instants indicated by the periodic discovery trigger. Alternatively, in block 715, UE 116 is expected to receive a discovery setup message 510 from eNB 103, such as Step 3 in FIG. 5, at the time or subframe instants indicated by the periodic discovery trigger.

When eNB 103 requests devices to engage in D2D discovery on an aperiodic basis, eNB 103 initiates an aperiodic discovery trigger. The value of the aperiodic discovery trigger is not explicitly indicated to UE 116. In certain embodiments, the aperiodic trigger is configured by eNB 103 based on an evaluation of metrics including volume of served data traffic, knowledge or estimation of device proximity, or higher layer signaling from the core network requesting device discovery. For example in a public-safety network, a command and control center monitoring an emergency response call can request that certain devices in the field perform device discovery in order to initiate low-latency and high reliability D2D communication.

In another example for the D2D discovery initiation in block 705, the discovery protocol is device initiated, such as in step 1 of FIG. 6. As illustrated in the example shown in FIG. 6, a D2D discovery request (DR) 605 can be sent from UE 116 ($U_T$) to eNB 103. The D2D DR 605 can indicate different discovery priority values. The discovery priority allows the device (such as UE 116) and network (via eNB 103) to have greater flexibility in devoting time/frequency and power resources that can match either the current radio conditions or the device usage scenario (i.e. higher priority for emergency data services over commercial data services). This discovery priority can be indicated to UE 116 by the network via higher layer signaling or can be indicated on UE 116 by an interface to an application.

In certain embodiments, UE 116 utilizes the D2D DR 605 to indicate to the network how many devices UE 116 wishes to discover. The D2D DR 605 can include the unique device identifiers for the devices that UE 116 wishes to discover in order to assist the network in discovery resource configuration. In certain embodiments, UE 116 identifies which devices to discover base on one or more of: an identifier (ID) configured by the network; and a new ID.

Discovery ID

In certain embodiments, the D2D DR 605 includes one or more Discover IDs. The discovery IDs represent unique device identifiers that are used in the discovery process. Alternatives of discovery IDs include: C-RNTI of UE 115 (i.e., $U_R$) (configured by eNB 103), or a new ID of UE 115 (i.e., $U_R$) for the D2D communications configured by eNB 103 (which is configured independently of the other RNTIs, i.e., C-RNTI, etc.), or an ID of UE 115 autonomously generated by UE 115 according to a pre-defined mechanism.

To provide flexibility in terms of the amount of overhead, UE 116 and the network can utilize different formats of the D2D DR 605. Examples of the different formats of the D2D DR 605 include a Basic DR (or blind) and a Targeted DR. Another format of the D2D DR 605 is configured to contain information of both the basic and the targeted DRs. An example format of the D2D DR 605 is given by the table 1 below. Accordingly, UE 116 can perform two types of discovery: blind or targeted. The discovery can be based on an ID based on a cell, an ID for the device, or a combination thereof.

A Basic DR is utilized to provide the minimal amount of information to the network to indicate that the device wishes to engage in discovery. In certain embodiments, UE 116 utilizes the Basic DR when UE 116 does not have knowledge of potential discovery candidates or may have previously indicated candidates to eNB 103. In certain embodiments, to reduce overhead UE 116 does not provide IDs of potential discovery candidates in the Basic DR.

UE 116 uses a Targeted DR to provide information on the number of devices to discover and their IDs in addition to the information provided by the Basic DR. In certain embodiments, UE 116 (i.e., $U_T$) determines how many devices and which device IDs to discover based on stored information regarding the results of previous device discovery periods or based on a network configured number devices or set of device IDs. The stored information can include statistics corresponding to wireless links to different devices. These statistics can include signal strength measurements, throughput and duration of data connections, as well as the type of data traffic exchanged between different devices.

TABLE 1

Discovery request message format

| Field | Description |
|---|---|
| Discovery Request Type | |
| 0 | Basic DR - only priority update |
| 1 | Targeted DR - priority update and device IDs for "targeted" discovery |
| Discovery Priority | |
| 0 | Low priority |
| 1 | High priority |
| Number of indicated device IDs (optional) | |
| 1-8 | Gives the size of the Device ID fields |
| Device IDs (optional) | |
| Up to 8 8-bit values | Indicate 8 unique IDs (out of 256 possible) |

In certain embodiments, in block 705, the device ($U_T$), such as UE 116, initiates the discovery protocol (such as in step 1 of FIG. 6). The determination is based on eNB 103 receiving an indication from UE 116 via a D2D DR 605 that UE 116 wishes to engage in device discovery. In certain embodiments, the transmission of the discovery request, D2D DR 605, is triggered by UE 116 in response to an application indicating that the application has data for UE 115. Alternatively, the transmission of the discovery request, D2D DR 605, is triggered by UE 116 in response to an application indicating that the application needs to receive data from UE 115.

In certain embodiments, in block 705, the device ($U_T$), such as UE 116, initiates the discovery protocol (such as in step 1 of FIG. 6) based on a configured discovery trigger, (such as a timer or event based trigger) wherein UE 116 requests to engage in D2D discovery on a periodic or aperiodic basis. This is similar to the discovery trigger (described herein above with respect to eNB 103), except that the discovery trigger is configured at UE 116, can be transparent to eNB 103 and determined by an application running on UE 116, or may alternatively be configured by the network via higher layer signaling. The purpose of the discovery trigger can be to update a UE D2D device database at UE 116, at eNB 103, or both, regarding the status and proximity of devices in the network. The UE D2D device database can be used by UE 116, at eNB 103, or both, to determine the feasibility of D2D discovery and/or communication.

Discovery Back-Off:

In certain embodiments, the network-signaled configuration for the periodic discovery trigger at UE 116 includes indicating an interval between discovery requests and a discovery back-off parameter, or a delay parameter. The discovery back-off parameter is configured to indicate whether UE 116 should increase or decrease its discovery attempts depending on the success or failure of D2D discovery protocol periods. The discovery back-off parameter, or the delay parameter, can be based on various factors, such as battery life of UE 116.

In a first example (Example 1): UE 116 is configured to engage in discovery periods every second (or alternately every 1,000 sub-frames). However, if UE 116 is not in close proximity to other devices (or if the configured discovery priority is lowered) the configured discovery periods may not be successful. The discovery back-off period can indicate that the device after X=4 failed discovery periods (wherein the value of X is configured by the network and indicated to UE 116 via higher layer signaling), the discovery period is increased by a factor Y=10 (that is, the effective discovery period is 10 seconds or 10,000 sub-frames). This back-off can be beneficial to reduce overhead in discovery period configuration between the device and the network especially in scenarios where the device is periodically engaged in discovery even during periods where the device is not in an RRC_connected state or synchronized with the network.

In a second example (Example 2): alternatively, when discovery is successful after X2 periods, or the indicated discovery priority changes, UE 116 is configured to increase the discovery period by a factor Y<1. That is, UE 116 is configured to shorten the discovery period to be less than a second or less than a 1,000 sub-frames (or reduced from ten seconds or 10,000 sub-frames if previously raised).

In cases in which UE 116 initiates the discovery protocol (that is, the device initiated network assisted discovery protocol shown in FIG. 6), alternatives of UE 116 transmitting D2D DR 605 to eNB 103 include:

a) UE 116 transmits a scheduling request (SR) to eNB 103 to request for a PUSCH scheduling, and D2D DR is transmitted on the scheduled PUSCH. For example, when the configured periodic or aperiodic discovery triggering occurs on UE 116 (by a higher layer application signaling for instance), UE 116 sends an SR to eNB 103 using a PUCCH format 1 message (if the eNB has not already scheduled uplink resources for the UE). In response, eNB 103 grants uplink resources (PUSCH) for UE 116 (via PDCCH downlink control information DCI format 0 message) to send a buffer status report (BSR) indicating the size and format of the D2D DR. In addition, eNB 103 will use the BSR to allocate sufficient PUSCH resources for the D2D DR and indicate this in another grant message via PDCCH. Upon receipt of the PUSCH grant UE 116 transmits its D2D DR 605.

b) UE 116 initiates a RACH procedure to transmit the D2D DR 605. For example, when UE 116 cannot utilize resources on the uplink shared channels (if it is RRC connected but not time-synchronized or is recovering from radio link failure) and has a high discovery priority, UE 116 can utilize the RACH to send a SR to eNB 103 in the L2/L3 message include in the random access procedure, with the remaining steps the same as Alt.3/4a). In response, eNB 103 will grant uplink resources for UE 116 to send a BSR indicating the size and format of the D2D DR 605. In addition, eNB 103 will use the BSR to allocate sufficient PUSCH resources for the D2D DR 605 and indicate this in another grant message via PDCCH. Upon receipt of the PUSCH grant UE 116 transmits its D2D DR 605.

c) UE 116 sends D2D DR 605 on the PUCCH. For example, when a Basic DR is utilized, in order to reduce the latency and overhead of the signaling, UE 116 can utilize a PUCCH message and transmit the D2D DR 605 without needing to request PUSCH transmission resources.

In block 710, a discovery feasibility measurement is performed. In certain embodiments, eNB 103 configures a D2D discovery feasibility measurement (DFM) 505, 610 between UE 116 and UE 115 (that is between $U_T$ and $U_R$), and, in response, UE 116 and UE 115 each transmit a D2D DFM 505, 610 report to eNB 103. The DFM 505, 610 determines what is the context of the devices (e.g., whether D2D is feasible between UE 116 and UE 115 or not, and so forth). The D2D DFM 505, 610 reports are used by eNB 103 to determine whether eNB 103 should configure a discovery period.

The DFM 505, 610 is optional and, in certain embodiments, eNB 103 utilizes a legacy measurement reporting mechanism as part of the assessment of device discovery feasibility in block 710. For example, eNB 103 can utilize legacy intra-frequency and inter-frequency measurement configurations utilized in cell connection and handoff procedures, which are indicated to UE 116 by RRC signaling as well as their corresponding measurement reporting procedures utilized to transfer measurement results from UE 116 to E-UTRAN.

In certain embodiments, eNB 103 first checks the RRC connectivity status (connected or idle) of UE 116 and UE 115. If one or both UE 116 and UE 115 currently are in idle state, eNB 103 uses a paging message to "wake up" the UE 116 and UE 115.

The network uses stored information about UE 116 and UE 115 to configure the discovery period. The network can use the stored information to first determine the feasibility of performing D2D discovery. The stored information can include at least one of battery power levels, relative locations, GPS location data (or other location data obtained by positioning signal measurement between the UE device and eNB 103), UE device category, discovery priority, and type of data to be transmitted of UE 116 and UE 115. For example, eNB 103 can use the most recent locations of UE 116 and UE 115 and their remaining battery power to determine if the UE devices are in proximity such that sufficient transmit power resources can be expended to complete the discovery process.

In certain embodiments, eNB 103 periodically or aperiodically queries UE 116 and UE 115 to obtain the necessary information for discovery configuration. The stored information may not be utilized due to the lack of the necessary information (such as when UE 116 and UE 115 have recently connected and have not yet provided it to the network) or if the information available is determined to be not current enough to be effectively utilized. If the network polls the UE 116 and UE 115 periodically to update the information, the network can wait until the next scheduled period, or the network can determine to poll the UE 116 and UE 115 on an on-demand basis.

In certain embodiments, in order to query UE 116 and UE 115, eNB 103 configures a discovery feasibility period for UE 116 and UE 115 and transmits a discovery feasibility measurement (DFM) request message to UE 116 and UE 115 via a downlink control channel message.

The DFM request can indicate the time/frequency resources for obtaining a measurement reference signal (RS) from eNB 103 and time/frequency resources for reporting the measurement results. The time/frequency resources previously described can be explicitly signaled in the measurement request message or a device, such as UE 116 and UE 115, can rely on a configuration of measurement parameters that are stored as default or previously stored after being configured by higher layer signaling. An example format of the DFM request is given by Table 2

TABLE 2

| Field | Description |
|---|---|
| Discovery Setup Type | |
| 0 | Default measurement resources used (not explicitly configured) |
| 1 | Measurement time/frequency resources explicitly configured |
| GPS measurement trigger | |
| {0, 1} | Indicates whether the device should make a GPS measurement |
| Battery power report trigger | |
| {0, 1} | Indicates whether the device should report battery power |
| Measurement RS index (optional) | |
| 2 length 4-bitmaps | Indicates measurement RS time/frequency configuration for transmission and reception |
| Transmit Power (optional) | |
| 2-bit field | Indicates which of 4 Tx power levels to use |

DFM request format

Based on the received DFM request messages, UE 116 and UE 115 perform the desired measurement transmission and receptions. In addition UE 116 and UE 115 prepare a DFM report message to send to eNB 103 on the configured time/frequency resources. The DFM report message can include GPS location data and/or sounding signal measurement between the eNB 103 and UE 116 and UE 115. Following the reception of the DFM report for UE 116 and UE 115, eNB 103 updates its stored information table based on the relevant received parameters. An example format of the DFM report is given in Table 3:

TABLE 3

| Field | Description |
|---|---|
| RSRP measurements | |
| measurement configured by Table 2 | Provides RSRP for the configured RS |
| Channel quality measurements | |
| measurement configured by Table 2 | Provides estimate of channel quality for the configured RS |
| Location data | |
| 12-bit field | GPS or differential GPS update |
| Battery power report | |
| 2-bit field | Maps to 4 different levels (>75%, >50%, >25%, >0%) |

DFM report format

In block 715, discovery setup messages are communicated. For example, in block 715, eNB 103 determines and configures appropriate discovery resources, associated messages, and transmits discovery setup information via RRC signaling. Once eNB 103 has determined the feasibility of discovery setup and determines the relevant parameters, eNB 103 configures a discovery setup message (DSM) 510, 615 to transmit. The DSM 510, 615 can include an indication of time/frequency resources for discovery, transmit power, discovery timer, discovery IDs, the number of devices to discover, and associated discovery priority.

For example, the time/frequency resources utilized for discovery can be divided into discovery resource blocks (DRB) or consecutive DRB groups (DRBG). The time/frequency resources utilized for discovery can be explicitly or implicitly indicated by eNB 103 in the DSM 510, 615. In the case of implicit indication, UE 116 selects a particular set of time/frequency resources already known at UE 116 via higher-layer configuration or set as default. The selection at UE 116 also can be from mapping a configuration index (as given in Table 2) transmitted by eNB 103 in the DSM to a set of time/frequency resources already known at UE 116 via higher-layer configuration or set as default. In the case of explicit indication the following are alternative embodiments:

In a first alternative (Alt. 1): eNB 103 indicates a subset of individual. DRBs allocations within a set of DRBGs via bitmap. A bit value of zero in the bitmap indicates that the corresponding DRBG is not utilized for discovery. The number of bits in the discovery resource configuration bitmap N is determined by the number of total discovery resource allocations allocated by the network. The bitmap A forms the bit sequence $a_{N-1}, \ldots, a_3, a_2, a_1, a_0$ where $a_0$ is the least significant bit (LSB) and $a_{N-1}$ is the most significant bit (MSB).

In the second alternative (Alt. 2): eNB 103 indicates the time/frequency resources (DRB or DRBG) allocations via one-to-one bitmap. A bit value of zero in the bitmap indicates that the corresponding DRB or DRBG is not utilized for discovery. The number of bits in the discovery resource configuration bitmap N+1 is determined by the number of total discovery resource allocations allocated by the network along with an additional bit to signal the subset of DRBs within the DRBG. The bitmap A forms the bit sequence $a_N, a_{N-1} \ldots, a_3, a_2, a_2, a_1, a_0$ where $a_0$ is the least significant bit (LSB) and $a_N$ is the most significant bit (MSB). The bit $a_N$ indicates inside of the DRBG which DRBs are utilized for discovery.

In a third alternative (Alt. 3): eNB 103 indicates a set of RBs or RBGs via an index of a starting DRB or DRBG and a length in terms of contiguously allocated RBs or RBGs.

In certain embodiments, a subset of device criteria that have been utilized in the device feasibility determination 510, 615 are used to define a number of supported scenarios for which different discovery configurations are utilized. An example mapping is given in Table 4:

TABLE 4

Discovery Configuration/Device Criteria mapping

| Discovery Config. Index | Device Criteria | | |
| --- | --- | --- | --- |
| | Battery Power ($U_T$, $U_R$) | Discovery Priority | Relative location |
| 0 | <50% | 0 | <50 m |
| 1 | >50% | 0 | <50 m |
| 2 | <50% | 1 | <50 m |
| 3 | >50% | 1 | <50 m |
| 4 | <50% | 0 | <200 m |
| 5 | >50% | 0 | <200 m |
| 6 | <50% | 1 | <200 m |
| 7 | >50% | 1 | <200 m |

In certain embodiments, a subset of discovery period parameters are mapped to a discovery configuration index.

Thus, eNB 103 transmits the configuration index to UE 116 and, based on the table, UE 116 can determine the appropriate settings for the parameters. An example mapping is given in Table 5:

TABLE 5

Discovery Configuration/parameter mapping

| Discovery Config. Index | Discovery Parameter | | |
| --- | --- | --- | --- |
| | Transmit Power ($U_T$, $U_R$) | Discovery Sequence Length (symbols) | Discovery Timer ($T_{disc}$) |
| 0 | Min Tx Pwr | 8 | 5 ms |
| 1 | Max Tx Pwr | 8 | 5 ms |
| 2 | Min Tx Pwr | 16 | 10 ms |
| 3 | Max Tx Pwr | 16 | 10 ms |
| 4 | Min Tx Pwr | 32 | 10 ms |
| 5 | Max Tx Pwr | 32 | 10 ms |
| 6 | Min Tx Pwr | 32 | 20 ms |
| 7 | Max Tx Pwr | 32 | 20 ms |

The discovery timer is utilized to manage the duration of the discovery procedure and enable coordination between UE 116 and UE 115 as well as eNB 103. The discovery timer can be specified as time duration or in terms of a number of subframes. A longer discovery timer can accommodate a more robust discovery operation through giving UE 116 and UE 115 more time to transmit and listen for discovery beacons or signals. A shorter timer can be configured to improve the power and processing efficiency of the device (such as UE 116 or UE 115) and may not result in a performance degradation in the situation where UEs participating in discovery experience good channel conditions (if for example they are all located relatively close to one another).

Part of the discovery process includes searching and identifying discovery IDs (as illustrated in block 705) of nearby devices. Depending on the network configuration several alternative embodiments may be considered:

In a first alternative (Alt. 1), the network explicitly indicates the candidate device IDs to search as part of the configuration message or an index of a table mapping to a preconfigured discovery ID in order to reduce the size of the control message field. Explicit indication of the discovery IDs facilitates a "targeted" discovery protocol wherein only a subset of specifically identified devices will be discovered even if a larger set of devices simultaneously participate in the discovery. Discovery signaling efficiency is one benefit of a targeted discovery, since device IDs can be ignored if they are not in the set of those explicitly indicated and the discovery protocol shortened by discontinuing reception of the related discovery signaling. Also, if the discovery IDs of the indicated devices are obtained by a device before the expiration of a configured discovery timer, the device may terminate the discovery signaling and preserve processing and transmit power resources. The amount of storage and processing resources can be minimized through configuring only those resources needed for the indicated number of devices to discover.

In a second alternative (Alt. 2), the discovery IDs is not explicitly signaled by eNB 103. Instead a number $N_d$ of devices to be discovered by the UE is indicated in the message.

In certain embodiments, indicating the number of devices facilitates a "blind" discovery protocol. The blind discovery protocol allows many devices to perform discovery even if their discovery IDs are not known beforehand. This approach can be beneficial in a scenario where the network is not currently aware of which devices may be within a feasible discovery range of the targeted UE (such as UE 116) either because eNB 103 or network does not track that information or its currently stored proximity information is determined to be out-of-date. However the network can limit UE 116 to discover only a few devices (the $N_d$ closest for example) due to power efficiency or data resource scheduling and bandwidth constraints. Once $N_d$ devices have been discovered, UE 116 can discontinue discovery signaling and/or reception. Limiting discovery by UE 116 can also be utilized when all or some of the devices within discovery range of the targeted device are not currently connected to eNB 103.

An example of a configured DSM is given in Table 6 based on the above described parameters:

TABLE 6

DSM format

| Field | Description |
| --- | --- |
| Discovery Setup Type | |
| 0 | Indicates "blind discovery" |
| 1 | Indicates "targeted discovery" |
| Discovery Configuration Index | |
| 0-7 | See Table 4 |
| Number of indicated device IDs $N_d$ (optional) | |
| 1-8 | Gives the size of the Device ID fields |
| Device IDs (optional) | |
| Up to 8 8-bit values | Indicate 8 unique IDs (out of 256 possible) |
| DRB/DRBG map | |
| bitmap A | $a_i$ indicates whether or not the corresponding DRB or DRBG is utilized for discovery |

Embodiments of the network-assisted discovery protocol provides the ability to inform eNB 103 regarding the success or failure the discovery protocol and the ability to provide feedback with regard to parameters relevant for future device discovery configurations. In certain embodiments, a discovery report message is configured by eNB 103 or network and indicated to UE 116 in the DSM 510, 615. The report message configuration can include an indication of the time/frequency resources to be utilized for the report transmission as well as an indication of relevant statistics or other information to be included in the report. The information elements to be included in the report can include the total elapsed discovery time, received signal power of discovery beacons or signal, channel quality measurements or estimates, relative or exact location information, detected device IDs, and any higher layer context information which may be exchanged as part of the discovery process. Additionally the discovery report configuration may also indicate which device(s) will transmit the discovery report for a given discovery period.

After the DSM 510, 615 is determined by eNB 103, the DSM 510, 615 is transmitted via a downlink control message, which can be configured on a periodic or aperiodic basis.

In a first alternative (Alt. 1), a DCI configuring the PDSCH to carry the DSM is transmitted to UE 116 and UE 115 in a UE-specific search space of PDCCH/ePDCCH. In this case, the CCEs/eCCEs for the different UEs are orthogonal and the search space.

In a second alternative (Alt. 2), eNB 103 transmits to UE 116 and UE 115 a DCI configuring the PDSCH to carry the DSM 510, 615 in a common search space of PDCCH/ePDCCH. In the case where multiple UEs are engaged in discovery with the same set or subset of UEs, redundancy can be removed and decoding complexity reduced as the DSMs 510, 615 are multicast to UE 116 and UE 115 in the same downlink resources.

In a third alternative (Alt. 3), in a hybrid combination of Alt 1. and Alt 2. wherein certain parts of the DSM 510, 615 are transmitted in a UE-specific manner, and other parts of the message are multicast as a common control message.

In a first example (Example 1): the discovery setup type and discovery configuration index fields can be multicast to all UEs if eNB 103 determines that these parameters are shared in common. However the number of indicated device IDs, the Device IDs are transmitted in a UE specific manner since eNB 103 can restrict devices to only discover a subset of all the devices participating in the discovery period. Additionally, the DRB/DRBG mappings are transmitted in a UE-specific manner since they can be orthogonally assigned to each UE.

In a second example (Example 2): Same as Example 1, expect the number of Device IDs and the Device IDs are transmitted as part of the common DSM instead of on a UE-specific basis. This can be beneficial to reduce DSM overhead if a large number of devices are to engage in discovery without restriction.

In block 720, UE 116 and UE 115 perform the D2D discovery protocol. UE 116 and UE 115 engage in the device discovery method based on the received discovery setup information. UE 116 and UE 115 communicate directly with each other to perform the device discovery. The direction communication can be a direct wireless fidelity (wi-fi) connection.

At the conclusion of discovery phase, UE 116 and UE 115 determine the outcome of the discovery process. Determining the outcome of the discovery process can include determining whether unique device identifiers (this identifier may be the same as the said discovery ID) are received, measurement of physical layer parameters including estimates of channel quality between the detected devices, and relative or exact location information. Furthermore, messaging can be included as part of the discovery procedure, wherein devices exchange higher layer information including data buffer status, QoS level, device capabilities, active applications, and user context. These higher layer parameters also can be used to determine if the discovery process is successful besides physical layer thresholds.

The status of each discovery attempt can be indicated via bitmap. A bit value of zero in the $i^{th}$ bit indicates that the discovery attempt corresponding to the $i^{th}$ device ID as configured by the discovery setup was not successful. The number of bits in the discovery resource configuration bitmap is $N_d$. The bitmap B forms the bit sequence $b_{Nd-1}, \ldots, b_3, b_2, b_2, b_1, b_0$ where $b_0$ is the least significant bit (LSB) and $b_{N-1}$ is the most significant bit (MSB).

In block 725, a discovery report is prepared. Upon determination of successful or failed device discovery, UE 116 transmits a discovery report message to the network via an uplink control channel. An example of the discovery report message format is given by Table 7:

TABLE 7

Discovery report message format

| Field | Description |
| --- | --- |
| Discovery Result | |
| Bitmap B | $b_i$ indicates whether or not the discovery signaling with the corresponding device ID succeeded |
| Channel quality | |
| # of measurements configured by $N_d$ | Provides estimate of channel quality for each of the discovery attempts |
| Est. relative locations | |
| # of measurements configured by $N_d$ | Provides estimate of relative location for each device ID |
| Discovery Time | |
| 0-$T_{disc}$ | Indicates total time needed for discovery (up to maximum $T_{disc}$) |

In a first alternative (Alt. 1), only one device transmits the device discovery report. The device transmitting can be configured by a downlink discovery report configuration message or may be set as default. For example, UE 116 ($U_T$), as the a device with data to transmit following discovery can be the default device to transmit a report.

In the second alternative (Alt. 2), all devices transmit a device discovery report utilizing the received downlink control message containing the device report configuration.

Upon receipt of a single or multiple discovery reports, eNB 103, or the network, uses the report to update its related D2D databases. The discovery report also can be used by eNB 130, or the network, to determine optimal or desired D2D communication resources for the discovered devices. Once the discovery protocol is completed, the network or the devices (UE 116, UE 115, or both) can determine whether to proceed with a D2D or cellular communications protocol or in the case of discovery failure reinitiate a D2D discovery or cellular communications protocol.

FIG. 8 illustrates a signaling flow for a device initiated network-assisted device discovery protocol according to embodiments of the present disclosure. The embodiment of the signaling flow 800 shown in FIG. 8 is for illustration only. Other embodiments could be used without departing from the scope of the present disclosure.

UE 116 signals discovery request 805 (if device initiated) to eNB 103. In response, eNB 103 determines discovery feasibility in block 810. In certain embodiments, eNB 103 sends a "wakes up" to UE 115 via paging 815 if necessary. Thereafter, eNB 103 sends UE-specific DFM request 820 to UE 116 and to UE 115. The UE-specific DFM request 820 can be a broadcast message or the UE-specific DFM request 820 can be UE-specific. Each of the devices, UE 116 and UE 115, transmit a respective UE-specific DFM report 825 to eNB 103. In response, eNB 103 determines discovery configuration in block 830. Then, eNB 103 sends a UE-specific DSM 835 to each of UE 116 and UE 115. In response, UE 116 and UE 115 perform discovery in block 840. Thereafter, each of UE 116 and UE 115 transmit a UE-specific discovery report 845. In response, eNB 103 determines discovery success or failure in block 850. If discovery is successful, D2D Communication Protocol 855 is performed by UE 116 and UE 115. If discovery is failure, eNB 103 resends or sends new discovery period configuration message 820 based on discovery priority. In certain embodiments, eNB 103 repeats sending the UE-specific DSM 835. In certain embodiments, one or more of the UE-specific DFM request 820 and the UE-specific DFM report 825 use a legacy measurement reporting mechanism.

Although in many cases, the D2D-enabled devices that are to engage in discovery are all located within the coverage of a single eNB, many scenarios, especially those related to emergency services provided by public safety groups, may require UEs outside the range of the network to be able to communicate with one another. In this case, having a common protocol framework for in and out-of-coverage device discovery is beneficial both to reduce implementation cost and complexity and to allow efficient and interference-free management of hybrid scenarios where some devices are within coverage and others are not.

Figure 9:
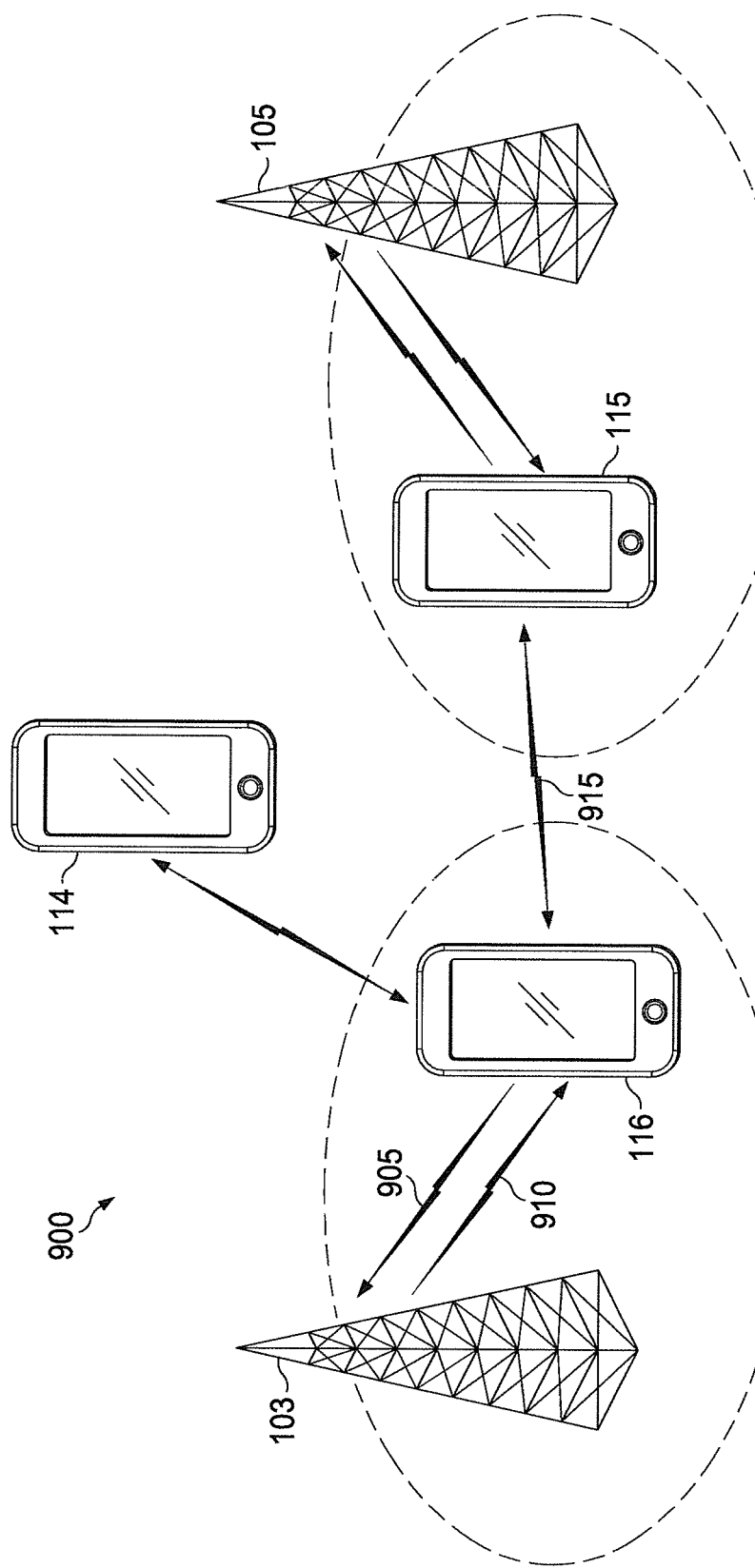
FIG. 9 illustrates in-coverage and out-of-coverage network-assisted D2D discovery and communication according to embodiments of the present disclosure.

FIG. 9 illustrates in-coverage and out-of-coverage network-assisted D2D discovery and communication according to embodiments of the present disclosure. The embodiment of the in-coverage and out-of-coverage network-assisted D2D discovery and communication 900 shown in FIG. 9 is for illustration only. Other embodiments could be used without departing from the scope of the present disclosure.

In the example shown in FIG. 9, UE 116 is located within a coverage area of eNB 103. UE 115 is located within a coverage area of eNB 102. UE 114 is located in an area that is outside the coverage network of eNB 102 and eNB 103. To perform in-coverage and out-of-coverage network-assisted D2D discovery and communication, UE 116 transmits a discovery request or discovery report 905 to eNB 103. In response, eNB 103 transmits a discover configuration 910 to UE 116. Thereafter, UE 116 and UE 115 communicate discovery signals 915 between each other.

Figure 10:
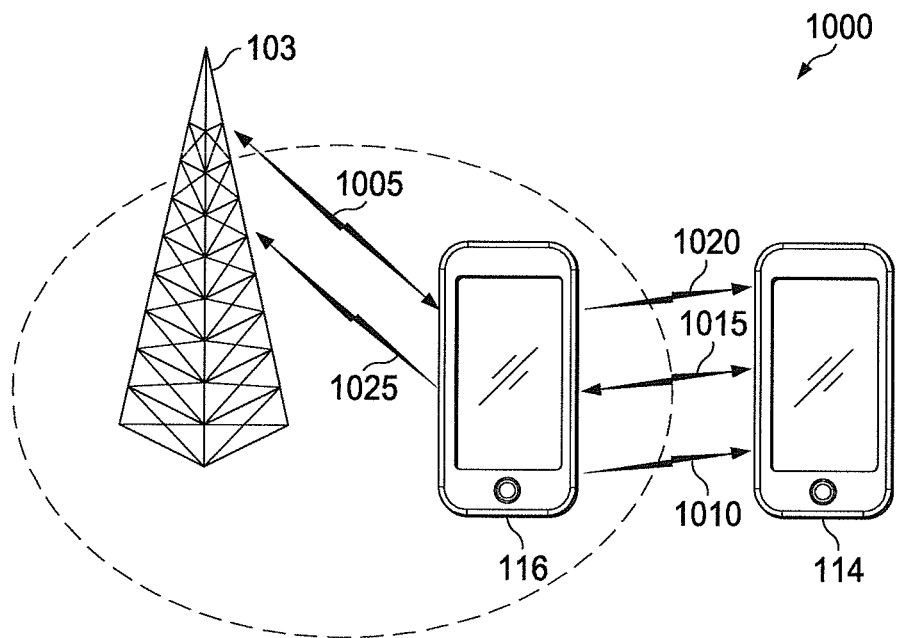
FIG. 10 illustrates a hybrid ad-hoc/network assisted device discovery according to embodiments of the present disclosure.

FIG. 10 illustrates a hybrid ad-hoc/network assisted device discovery according to embodiments of the present disclosure. The embodiment of the hybrid ad-hoc/network assisted device discovery 1000 shown in FIG. 10 is for illustration only. Other embodiments could be used without departing from the scope of the present disclosure.

In certain embodiments, a hybrid ad-hoc/network assisted device discovery is performed wherein at least one of the devices to engage in D2D communication and discovery is within a communication range of the network, while at least one of the devices is not within coverage of the cellular network. In the example shown in FIG. 10, the system includes eNB 103 and two D2D enabled UEs: UE 116, which is within the communication range of eNB 103 and UE 114, which is outside the coverage of the cellular network. Although only two UEs are considered, the following description could be generalized to consider discovery between a plurality of UEs. The discovery protocol is divided into one or more of the following 4 phases: 1. discovery request and configuration 1005, 2. Sync signal transmission and discovery information broadcast 1010, 3. D2D discovery signal transmission 1015 and reception 1020, and 4. discovery report messaging 1025 in the case of discovery success or failure.

Figure 11:
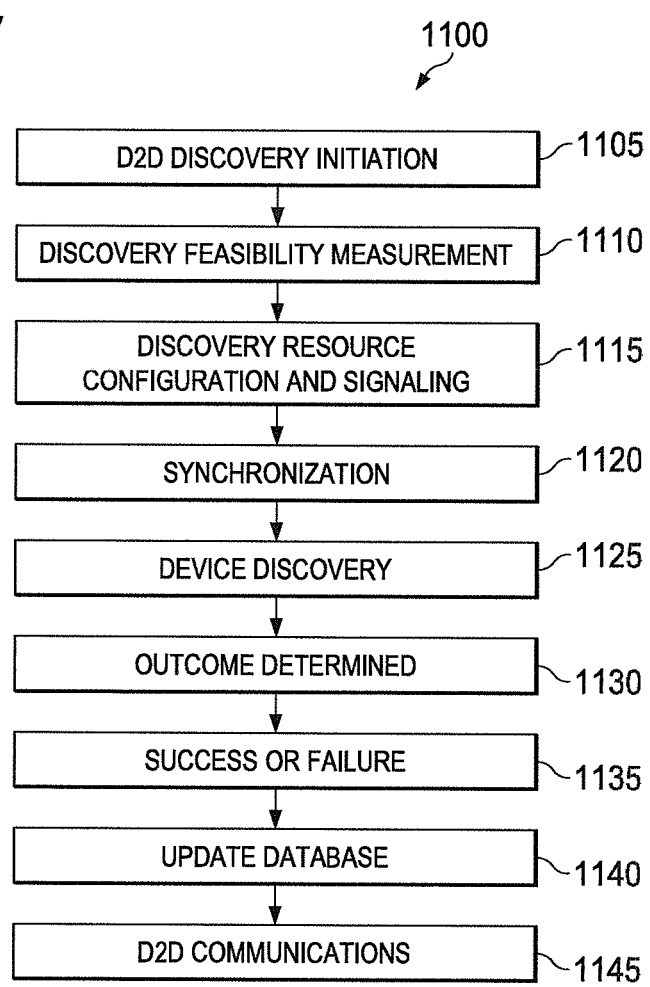
FIG. 11 illustrates a hybrid ad-hoc/network assisted device discovery protocol according to embodiments of the present disclosure.

FIG. 11 illustrates a hybrid ad-hoc/network assisted device discovery protocol according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, an eNB or a UE.

In block 1105, discovery initialization is performed. The D2D hybrid ad-hoc discovery protocol between UE 116 and UE 114 is network-initiated or UE-initiated. In the first alternative (Alt. 1), the D2D discovery protocol is network-initiated. However, a second alternative (Alt. 2) considers the scenario where the discovery protocol is device-initiated by UE 116, the in-coverage (IC) UE.

In the network initiated discovery protocol, the discovery protocol can be initiated based upon a discovery trigger at eNB 103, wherein eNB 103 configures devices to engage in D2D discovery on a periodic or aperiodic basis depending upon a value of the discovery trigger. The initiation of the discovery protocol can be performed in order to update a D2D database at eNB 103 regarding the status and proximity of devices in and outside the network. The D2D database can be used by eNB 103 to determine the feasibility of D2D discovery and/or communication.

a) When eNB 103 decides to periodically initiate the discovery protocol for UE 116, the time/frequency resource associated with the trigger is configured by the network and indicates the period between device discovery attempts (in terms of time units or sub-frames) and an initial sub-frame offset. The time frequency resource associated with the periodic trigger can be explicitly indicated to UE 116 via an RRC configuration message. UE 116 is expected to receive, from eNB 103, a discovery feasibility message (such as in as step 2 in FIG. 5,) or a discovery setup message (explained in Step 3 in FIG. 5) at the time or subframe instants indicated by the configuration.

b) When an aperiodic discovery trigger is utilized, the value of the trigger is not explicitly indicated to UE 116. That is, UE 116 can receive DFM or DSM in all the sub-frames (without any restriction on the sub-frames). The DFM or DSM can be configured by eNB 103 to UE 116 based on an evaluation of metrics including volume of served data traffic, knowledge or estimation of device proximity, or higher layer signaling from the core network requesting device discovery. For example in a public-safety network, a command and control center monitoring an emergency response call may request to the network that certain devices perform device discovery in order to initiate low-latency and high reliability D2D communication.

c) Alternatively, eNB 103 can initiate the discovery protocol based upon an aperiodic discovery trigger, however the sub-frames (or set of sub-frame numbers) in which a DFM or DSM can be received by UE 116 are restricted as pre-defined by the LTE standard or configured by the network via higher-layer signaling.

In the UE-initiated protocol, a D2D discovery request (DR) 1005 can be sent from UE 116 to eNB 103, as shown in FIG. 10. The D2D DR 1005 can be same as, or similar to the D2D DR 605. The D2D DR 1005 includes a field indicating a discovery priority value. The discovery priority allows the device and network to have greater flexibility in devoting time/frequency and power resources, which can match either the current radio conditions or the device usage scenario (i.e. higher priority for emergency data services over commercial data services). This discovery priority can be indicated to UE 116 by the network via higher layer signaling or can be indicated on UE 116 by an interface to an application.

In certain embodiments, the D2D DR 1005 includes a field indicating a discovery configuration index. The discovery configuration index maps to a set of discovery configuration parameters (for example transmit power and discovery period duration), which can further correspond to a set of device criteria such as battery power or relative proximity of devices. Further details of the discovery configuration index are illustrated in detail herein below. This UE feedback of a recommended configuration index assists eNB 103 when it determines the configuration of discovery parameters to send to UE 116, although eNB 103 can decide to ignore the suggested index provided by UE 116 and utilize a different configuration or not configure discovery parameters altogether.

In certain embodiments, UE 116 also utilizes the D2D DR 1005 to indicate to the network how many devices UE 116 wishes to discover, along with their unique device identifiers, in order to assist the network in discovery resource configuration. In this case, the D2D DR 1005 includes a field to indicate one or more of: the number of devices that UE 116 wishes to discover and discovery IDs that UE 116 wishes to discover.

Discovery ID:

As described herein above, the discovery IDs represent unique device identifiers that are used in the discovery process. Alternatives of discovery IDs include: a combination of the PCI of eNB 103 and the C-RNTI of UE 116 (configured by eNB 103), or a new ID of UE 116 for the D2D communications configured by eNB 103 (which is configured independently of the other RNTIs, i.e., C-RNTI, and so forth), or an ID autonomously generated by UE 116 according to a pre-defined mechanism, which is especially beneficial for facilitating discovery with devices that are outside of network coverage as their discovery IDs may not be able to be based upon parameters configured by the network. In the case of autonomously generated discovery IDs a seed value for generating the ID may be preconfigured or the network may indicate the value with RRC signaling. Examples of a discovery ID seed include the PCI or VCID of the serving cell, or the UE's C-RNTI, MAC ID, or international mobile subscriber identity (IMSI).

In certain embodiments, the D2D DR 1005 is configured differentiate between discovery requests utilized for discovery between devices within network coverage (IC DR) and an ad-hoc discovery request for devices outside of network coverage since the network may need to configure additional or different resources to allow the IC UE (UE 116) and the out-of-coverage (OOC) UE(s) (UE 114) to have a synchronized discovery period as well as well-defined common and UE-specific discovery resources. Also, depending on UE context or capability, different priority can be given to IC vs. OOC discovery (that is, UE 116 vs UE 114 discovery). The Discovery Request Type field in the D2D DR 1005 can be used to select between an IC-oriented discovery mode and one for network-assisted ad-hoc discovery.

Accordingly, D2D DR 1005 can include at least one of the following fields: Discovery priority; Discovery configuration index; Number of devices to discover; Device Ds to discover; and Device request type. In addition, to provide flexibility in terms of the amount of overhead, different formats of the D2D DR 1005 can be introduced. Examples of the different formats of the D2D DR 1005 include a Basic DR (or blind) and a Targeted DR.

A Basic DR is utilized to provide the minimal amount of information to the network to indicate that the device wishes to engage in discovery with other devices. For example, the minimal information is an indication of whether an ad-hoc or non ad-hoc discovery mode should be configured as well as the relative priority level. It is noted that the relative priority level is beneficial, especially for public safety use cases where urgent D2D communication requests may need to be supported. In certain embodiments, UE 116 utilizes the Basic DR when UE 116 does not have knowledge of potential discovery candidates or may have previously indicated candidates to eNB 103. In certain embodiments, to reduce overhead UE 116 does not provide IDs of potential discovery candidates in the Basic DR.

UE 116 uses a Targeted DR to provide information on the number of devices to discover and their IDs in addition to the information provided by the Basic DR. In certain embodiments, UE 116 determines how many devices and which discovery IDs to discover based on stored information regarding the results of previous device discovery periods or a network configured number devices or set of discovery IDs. The stored information may include statistics corresponding to wireless links to different devices. These statistics may include signal strength measurements, throughput and duration of data connections, as well as the type of data traffic exchanged between different devices.

An example format of the D2D DR 1005 is given by Table 8:

TABLE 8

Example discovery request message format

| Field | Description |
|---|---|
| Discovery Request Type | |
| 0 | Basic DR discovery IDs not indicated |
| 1 | Targeted DR - indicates discovery IDs for "targeted" discovery |
| 2 | Ad-Hoc Basic DR - blind ad-hoc discovery mode |
| 3 | Ad-Hoc Targeted DR - provides discovery IDs of OOC devices for targeted ad-hoc discovery |
| Discovery Priority | |
| 0 | Low priority |
| 1 | High priority |
| Discovery Config. Index (optional) | |
| 0-7 | Indicates UE-recommendation for discovery configuration at eNB |
| Number of indicated discovery IDs (optional - for targeted DRs only) | |
| 1-8 | Gives the size of the Discovery ID fields |
| Discovery IDs (optional - for targeted DRs only) | |
| Up to 8 10-bit values | Indicate 8 unique IDs (out of 1024 possible) |

It is noted that another format of the D2D DR 1005 can straightforwardly be constructed similarly as Table 8, by down-selecting fields out of the fields in Table 8.

Another format of D2D DR 1005 can be defined to contain information of both the basic and the targeted DRs and can aggregate IC and OOC discovery DRs:

An example format and structure of such a combination DR is given by the instructions below:

```
Combination DR = {
    Basic DR
    Targeted DR
}
Where:
Basic DR ={
    Discovery Mode: 0 (Non Ad-Hoc) or 1 (Ad-Hoc)
    Discovery Priority: See Table 1
    Discovery Configuration Index: Optional - See Table 1
}
```

```
Targeted DR ={
    Discovery Mode: 0 (Non Ad-Hoc) or 1 (Ad-Hoc)
    Discovery Priority: See Table 1
    Discovery Configuration Index: Optional - See Table 1
    Number of Discovery IDs: Optional - See Table 1
    Discovery IDs: Optional - See Table 1
}
```

In certain embodiments, the discovery protocol is initiated when eNB 103 receives an indication from UE 116 via a D2D DR 1005 that it wishes to engage in device discovery. The transmission of the discovery request can be triggered by UE 116 due to an application indicating that the application has data for UE 114 or an application indicating that the application needs to receive data from UE 114.

In certain embodiments, the discovery protocol is initiated based upon a discovery trigger (of UE 116) wherein UE 116 requests to engage in D2D discovery on a periodic or aperiodic basis. This is similar to when eNB 103 receives an indication from UE 116 via a D2D DR 1005 that it wishes to engage in device discovery, except that the trigger is autonomously configured at UE 116 and may be transparent to eNB 103 and determined by an application running on the device or may alternatively be configured by the network via higher layer signaling. The purpose of the trigger may be to update a D2D database at UE 116, eNB 103, or both, regarding the status and proximity of devices in the network. The D2D database can be used by UE 116, eNB 103, or both to determine the feasibility of D2D discovery and/or communication.

Discovery Back-Off:

In certain embodiments, the network-signaled configuration for the periodic discovery trigger at UE 116 includes a field indicating an interval between discovery requests and discovery back-off parameters. The discovery back-off parameters is configured to indicate whether UE 116 should increase or decrease its discovery attempts depending on the success or failure of D2D discovery protocol periods. The discovery back-off parameter, or the delay parameter, can be based on various factors, such as battery life of UE 116.

In a first example (Example 1): UE 116 is configured to engage in discovery periods every second (or alternately every 1,000 sub-frames). However, if UE 116 is not in close proximity to other devices (or if the configured discovery priority is lowered) the configured discovery periods may not be successful. The discovery back-off period can indicate that the device after X=4 failed discovery periods (wherein the value of X is configured by the network and indicated to UE 116 via higher layer signaling), the discovery period is increased by a factor Y=10 (that is, the effective discovery period is 10 seconds or 10,000 sub-frames). This back-off can be beneficial to reduce overhead in discovery period configuration between the device and the network especially in scenarios where the device is periodically engaged in discovery even during periods where the device is not in an RRC_connected state or synchronized with the network.

An example field structure of the back-off parameters may include an enable/disable field, a back-off trigger (X) based on the number of failed discovery attempts, and a back-off factor (Y):

```
discoveryBackoff = {
    backoffEnable: Boolean
```

```
        failedDiscoveryTrigger: {1-10}
        backoffFactor: {2,10,100}
    }
```

In a second example (Example 2): alternatively, when discovery is successful after X2 periods, or the indicated discovery priority changes, UE 116 is configured to increase the discovery period by a factor Y<1. That is, UE 116 is configured to shorten the discovery period to be less than a second or less than a 1,000 sub-frames (or reduced from ten seconds or 10,000 sub-frames if previously raised).

Alternative methods of UE 116 transmitting the D2D DR 1005 to eNB 103 include:

a) UE 116 transmits a scheduling request (SR) to eNB 103 to request for a PUSCH scheduling, and D2D DR 1005 is transmitted on the scheduled PUSCH. For example, when the configured periodic or aperiodic discovery triggering occurs on UE 116 (by a higher layer application signaling for instance), UE 116 sends an SR to eNB 103 using a PUCCH format 1 message (if the eNB has not already scheduled uplink resources for the UE). In response, eNB 103 grants uplink resources (PUSCH) for UE 116 (via PDCCH downlink control information DCI format 0 message) to send a BSR indicating the size and format of the D2D DR 1005. In addition, eNB 103 will use the BSR to allocate sufficient PUSCH resources for the D2D DR 1005 and indicate this in another grant message via PDCCH. Upon receipt of the PUSCH grant UE 116 transmits its D2D DR 1005.

b) UE 116 initiates a RACH procedure to transmit the D2D DR 1005. For example, when UE 116 cannot utilize resources on the uplink shared channels (if it is RRC connected but not time-synchronized or is recovering from radio link failure) and has a high discovery priority, UE 116 can utilize the RACH to send a SR to eNB 103 in the L2/L3 message include in the random access procedure, with the remaining steps the same as above). In response, eNB 103 will grant uplink resources for UE 116 to send a BSR indicating the size and format of the D2D DR 1005. In addition, eNB 103 will use the BSR to allocate sufficient PUSCH resources for the D2D DR 1005 and indicate this in another grant message via PDCCH. Upon receipt of the PUSCH grant UE 116 transmits its D2D DR 1005.

c) UE 116 sends D2D DR 1005 on the PUCCH. For example, when a Basic DR is utilized, in order to reduce the latency and overhead of the signaling, UE 116 can utilize a PUCCH message and transmit the D2D DR 1005 without needing to request PUSCH transmission resources.

In block 1110, discovery feasibility is performed. For example, eNB 103 can configure a D2D discovery feasibility measurement (DFM) for UE 116, and the corresponding D2D DFM report. The DFM reports can indicate the D2D context associated with the IC device. That is, the DFM reports can indicate whether D2D is feasible between UE 116 and another IC, such as UE 115, or OOC devices, such as UE 114, or not. The DFM reports can be used by eNB 103 to determine whether it should configure a discovery period.

The DFM is optional and, in certain embodiments, eNB 103 utilizes a legacy measurement reporting mechanism as part of the assessment of device discovery feasibility. For example, eNB 103 can utilize legacy intra-frequency and inter-frequency measurement configurations utilized in cell connection and mobility procedures, which are indicated to UE 116 by RRC signaling as well as their corresponding measurement reporting procedures utilized to transfer measurement results from UE 116 to E-UTRAN.

As a first step, the network uses stored information about the IC UEs, such as UE 116, UE 115, or both, to configure the discovery period. The stored information can be used to first determine the feasibility of performing D2D discovery. The stored information can include at least one of: battery power levels, relative locations, GPS location data (or other location data obtained by positioning signal measurement between UE 116 and eNB 103), device category, discovery priority, and type of data to be transmitted by UE 116. For example, eNB 103 can use the most recent locations of UE 116 and its remaining battery power to determine if the device is in proximity to the cell edge such that sufficient transmit power resources can be expended to complete the ad-hoc discovery process.

In certain embodiments, eNB 103 periodically or aperiodically queries UE 116 to obtain the necessary information for discovery configuration. The stored information may not be utilized due to the lack of the necessary information (such as when UE 116 has recently connected and has not yet provided the necessary information to the network) or when the information available is determined to be not current enough to be effectively utilized. If the network polls the UE devices periodically to update the information, the network can wait until the next scheduled period, or the network can determine to poll the UE devices on an on-demand basis.

In certain embodiments, in order to query the UE devices, eNB 103 configures a discovery feasibility period for UE 116. In addition, eNB 103 transmits a discovery feasibility measurement (DFM) request message to UE 116. The DFM request configuration message can include a field indicating the time/frequency resources for obtaining a measurement reference signal (MRS) from eNB 103 and time/frequency resources for reporting the measurement results. The time/frequency resources previously described can be explicitly signaled in the measurement request message or UE 116 can rely on a configuration of measurement parameters that are stored as default or previously stored after being configured by higher layer signaling. Alternatively, the MRS configuration can be predefined and eNB 103 selects one configuration from the set of possible configurations and indicates the index of the configuration in the DFM request message.

Additionally, the DFM reports can include a field of discovery configuration index, so that UE 116 can recommend a desired discovery configuration index to eNB 103. As mentioned previously, the discovery configuration index maps to a set of discovery configuration parameters (for example transmit power and discovery period duration), which further corresponds to a set of device criteria such as battery power or relative proximity of devices. This UE feedback of a configuration index as part of the DFM assists eNB 103 when eNB 103 determines the configuration of discovery parameters to send to UE 116 when the discovery protocol is network-initiated, and no DR is transmitted by UE 116 to eNB 103. However, eNB 103 may choose to ignore the suggested configuration index and utilize another configuration or may not configure discovery parameters.

An example format of the DFM request is given by the table below:

TABLE 9

DFM request format

| Field | Description |
|---|---|
| Discovery Setup Type | |
| 0 | Default measurement resources used (not explicitly configured) |
| 1 | Measurement time/frequency resources explicitly configured |

TABLE 9-continued

DFM request format

| Field | Description |
|---|---|
| Location measurement trigger | |
| {0, 1} | Indicates whether the device should make a location measurement (e.g., by GPS and/or positioning reference signals) |
| Battery power report trigger | |
| {0, 1} | Indicates whether the device should report battery power |
| Discovery configuration index trigger - optional | |
| {0, 1} | Indicates whether the device should report a recommended discovery configuration index |
| Measurement RS index (optional) | |
| 0-3 | Indicates measurement RS time/frequency configuration for transmission and reception |
| Transmit Power (optional) | |
| 2-bit field | Indicates which of 4 Tx power levels to use |

In Table 9, whether UE 116 should include a field of discovery configuration index or not is configured by the network via a field of discovery configuration index trigger in the DFM request. In addition, the MRS can be CRS of a serving cell, or CSI-RS configured by a non-zero-power CSI-RS configuration, or small-cell discovery signal associated with a small cell (phantom cell). It is noted that DFM request of another format can straightforwardly be constructed similarly as Table 9, by down-selecting fields out of the fields in Table 9.

Based on the received DFM request messages, UE 116 performs the desired measurement transmission and receptions and prepares a DFM report message to send to eNB 103 on the configured time/frequency resources. The DFM report message can include location data and/or MRS measurement between eNB 103 and UE 116. Following the reception of the DFM report for UE 116, eNB 103 updates its stored information table based on the relevant received parameters. An example format of the DFM report is given by Table 10:

TABLE 10

DFM report format

| Field | Description |
|---|---|
| RSRP measurements | |
| measurement configured by Table 2 | Provides RSRP for the configured MRS |
| Channel quality measurements | |
| measurement configured by Table 2 | Provides estimate of channel quality for the configured MRS |
| Location data | |
| 12-bit field | location or differential location update |
| Battery power report | |
| 2-bit field | Maps to 4 different levels (>75%, >50%, >25%, >0%) |

TABLE 10-continued

DFM report format

| Field | Description |
|---|---|
| Discovery configuration index - optional | |
| 0-7 | Indicates one of 8 sets of discovery parameters |

It is noted that another format of the DFM report can straightforwardly be constructed similarly as Table 10, by down-selecting fields out of the fields in Table 10.

In block 1115, discovery configuration is performed. For example, eNB 103 determines and configures appropriate discovery resources, associated messages, and transmits discovery setup information via RRC signaling.

Once eNB 103 has determined the feasibility of discovery setup and determines the relevant parameters, eNB 103 configures a discovery setup message (DSM) to transmit. The DSM can include an indication of time/frequency resources for discovery, transmit power, discovery timer, discovery IDs, the number of devices to discover, and associated discovery priority. For example, the time/frequency resources utilized for a given discovery period may be divided into N discovery resource blocks (DRB) containing multiple discovery resource elements (DRE) transmitted in T dedicated discovery resource slots (DRS) and explicitly or implicitly indicated by eNB 103 in the DSM. The values of N and T may be pre-configured at eNB 103 and UE 116, defined by the standard, or configured by eNB 103 and indicated to UE 116 in the DSM.

In certain embodiments, a DRB corresponds to a PRB pair. In certain embodiments, a DRS corresponds to a sub-frame.

Figure 12:
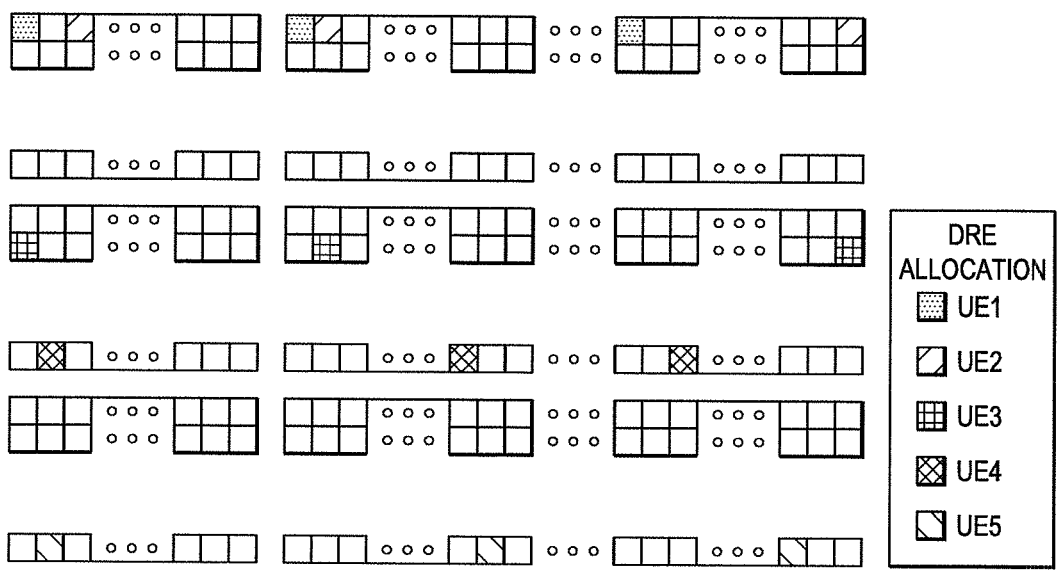
FIG. 12 illustrates a DRB and DRE configurations for a discovery period according to embodiments of the present disclosure.

FIG. 12 illustrates a DRB and DRE configurations for a discovery period according to embodiments of the present disclosure. The embodiment of the DRB and DRE configurations 1200 shown in FIG. 12 are for illustration only. Other embodiments could be used without departing from the scope of the present disclosure.

In the case of implicit indication, UE 116 selects a particular set of time/frequency resources already known at UE 116 via higher-layer configuration or set as default. The selection at UE 116 also can be from mapping a configuration index (as given in Table 12) transmitted by eNB 103 in the DSM to a set of time/frequency resources already known at UE 116 via higher-layer configuration or set as default. Alternatively, the discovery time/frequency resources may be determined by UE 116 according to a pre-defined mapping based upon one or multiple parameters including discovery ID, subframe or discovery slot index, and discovery priority.

In the case of explicit indication, the embodiments include: a first alternative (EI Alt. 1) wherein individual DRB and DRS allocations are indicated via bitmaps; a second alternative (EI Alt. 2) wherein a set of DRB and DRS allocations may be divided into DRB and DRS groups (DRBG and DRSG); and a third alternative (EI Alt. 3) wherein the resource allocation is indicated via sets of index triples (DRS index, DRB index, DRE index).

In certain embodiments, (EI Alt. 1): individual DRB and DRS allocations are indicated via bitmaps. A bit value of zero in the bitmap indicates that the corresponding DRB or DRS is not utilized for discovery. The number of bits in the discovery resource configuration bitmap N or T is determined by the number of total discovery resource blocks or slots allocated by the network respectively. The bitmap A indicates the DRB allocation and forms the bit sequence $a_{N-1}, \ldots, a_3, a_2, a_2, a_1, a_0$ where $a_0$ is the least significant bit (LSB) and $a_{N-1}$ is the most significant bit (MSB). Likewise the bitmap B indicates the DRS allocation and forms the bit sequence $b_{T-1}, \ldots, b_3, b_2, b_2, b_1, b_0$ where $b_0$ is the least significant bit (LSB) and $b_{N-1}$ is the most significant bit (MSB).

In certain embodiments, (EI Alt. 2): a set of DRB and DRS allocations may be divided into DRB and DRS groups (DRBG and DRSG). Each DRB or DRS group maps to a unique set of DRBs or DRSs. For example DRBG 1 may correspond to DRBs 0, 2, 4, and 6 while DRBG 2 corresponds to DRBs 1, 3, 5, and 7. The DRBG and DRSG allocations are indicated via bitmaps. A bit value of zero in the bitmap indicates that the corresponding DRBG or DRSG is not utilized for discovery. The number of bits in the discovery resource configuration bitmap $N_G$ or $T_G$ is determined by the number of total discovery resource block or slot groups allocated by the network respectively. The bitmap A indicates the DRBG allocation and forms the bit sequence $a_{N_G-1}, \ldots, a_3, a_2, a_2, a_1, a_0$ where $a_0$ is the least significant bit (LSB) and $a_{N_G-1}$ is the most significant bit (MSB). Likewise the bitmap B indicates the DRS allocation and forms the bit sequence $b_{T_G-1}, \ldots, b_3, b_2, b_2, b_1, b_0$ where $b_0$ is the least significant bit (LSB) and $b_{T_G-1}$ is the most significant bit (MSB).

In certain embodiments, (EI Alt. 3): the resource allocation is indicated via sets of index triples (DRS index, DRB index, DRE index).

In certain embodiments, UE 116 determines the allocation of discovery resources through a combination of explicit and implicit indications. For example, the DRB and DRS allocations can be explicitly indicated in the DSM, while the DRE allocations are implicitly derived by UE 116 using an aforementioned mapping in order to reduce the amount of control message overhead.

To facilitate ad-hoc discovery, the DSM may additionally indicate time/frequency resources for discovery, transmit power, discovery timer, discovery ID seed, the number of devices to discover, and associated discovery priority to be used by the OOC UE. The IC UE, UE 116, can generate a control message according to the DSM, and transmit the control message to the OOC UE, UE 114, as will be discussed in block 1120.

As an example, the time/frequency resources utilized for discovery can be divided into discovery resource blocks (DRB) or consecutive DRB groups (DRBG) and explicitly or implicitly indicated by eNB 103 in the DSM. In the case of implicit indication, UE 116 can select a particular set of time/frequency resources already known at UE 116 via higher-layer configuration or set as default.

In one embodiment, at least one device criteria, e.g., battery power, discovery priority, relative location, which may have been utilized in the device feasibility determination at eNB 103, may be used to define a number of supported parameter combinations, for which different discovery configurations are utilized. For example, eNB 103 can construct a mapping from discovery criteria to configuration index as given in Table 11 below, wherein each discovery configuration index corresponds to a device discovery criterion, comprising at least one of remaining batter power, discovery priority and relative location.

TABLE 11

Discovery Configuration/Device Criteria mapping

| Discovery Config. Index | Device Discovery Criteria | | |
|---|---|---|---|
| | Battery Power (UE1) | Discovery Priority | Relative location |
| 0 | <50% | 0 | <50 m |
| 1 | >50% | 0 | <50 m |
| 2 | <50% | 1 | <50 m |
| 3 | >50% | 1 | <50 m |
| 4 | <50% | 0 | <200 m |
| 5 | >50% | 0 | <200 m |
| 6 | <50% | 1 | <200 m |
| 7 | >50% | 1 | <200 m |

When UE 116 indicates to eNB 103 a recommended discovery configuration index as part of either the DR or DFM report as defined previously, the device criteria to discovery configuration mapping may be known at UE 116 by LTE standard definition, or pre-configuration via higher-layer signaling. Alternately, this criteria mapping may only be known at eNB 103 and is transparent to UE 116.

Additionally, a subset of discovery period parameters (to be defined later) can be mapped to a discovery configuration index, such as defined in Table 11. In this case, eNB 103 can transmit the configuration index to UE 116 and, based on Table 11, UE 116 can determine the appropriate settings for the parameters. An example mapping is given in Table 12 below, where the discovery configuration index is coupled with at least one of transmit power level, discovery sequence length, and discovery timer.

TABLE 12

Discovery Configuration/parameter mapping

| Discovery Config. Index | Discovery Parameter | | |
|---|---|---|---|
| | Transmit Power | Discovery Sequence Length (symbols/slots) | Discovery Timer ($T_{disc}$) |
| 0 | Tx Pwr Config 0 | 8 | 5 ms |
| 1 | Tx Pwr Config 1 | 8 | 5 ms |
| 2 | Tx Pwr Config 0 | 16 | 10 ms |
| 3 | Tx Pwr Config 1 | 16 | 10 ms |
| 4 | Tx Pwr Config 0 | 32 | 10 ms |
| 5 | Tx Pwr Config 1 | 32 | 10 ms |
| 6 | Tx Pwr Config 0 | 32 | 20 ms |
| 7 | Tx Pwr Config 1 | 32 | 20 ms |

Alternatively, the three parameters shown in Table 5 can also be individually and independently configured by means of configuring three separate fields in the DSM.

The transmit power parameters, including output power and/or power control parameters may be configured by the discovery configuration index. In Table 5, this is represented by different Tx Pwr Config values. For example Tx Pwr Config 0 can correspond to a pair of 3GPP LTE uplink power control parameters of power offset and fractional power control scaling factor (P0 and alpha in 36.213). Different configurations for discovery can be beneficial in order to support different discovery priorities. For example, a user with a high discovery priority may wish to utilize a higher transmit power than a user with a low discovery priority in order to increase the probability of successful reception of the discovery signals by other UEs which may not be in the immediate vicinity of UE 116.

A similar motivation may be given for the discovery sequence length in Table 12. The network may desire to flexibly tradeoff a potentially higher probability of successful discovery given by a large number of discovery signal transmission opportunities, for shorter discovery periods to allocate more resources for non D2D-communications and reducing the impact of discovery transmissions on the UE's battery, by configuring fewer discovery symbol transmissions or slots.

The discovery timer is utilized to manage the duration of the discovery procedure and enable coordination between the UEs as well as the base station. The discovery timer can be specified as time duration or in terms of a number of sub-frames. A longer discovery timer can accommodate a more robust discovery operation through giving the UEs more time to transmit and listen for discovery beacons or signals. A shorter timer can be configured to improve the power and processing efficiency of the device and may not result in a performance degradation in the situation where UEs participating in discovery experience good channel conditions (if for example they are all located relatively close to one another).

Part of the discovery process includes searching and identifying discovery IDs (as previously defined in block 1105) of nearby devices. Depending on the network configuration several alternative embodiments may be considered:

In a first alternative (ID Alt. 1) for targeted discovery configuration: the network can explicitly indicate the candidate discovery IDs to search for as part of the configuration message or an index of a table mapping to a preconfigured discovery ID in order to reduce the size of the control message field. Explicit indication of the discovery IDs facilitates a "targeted" discovery protocol wherein only a subset of specifically identified devices will be discovered even if a larger set of devices simultaneously participate in the discovery. Discovery signaling efficiency is one benefit of a targeted discovery, since discovery IDs can be ignored if they are not in the set of those explicitly indicated and the discovery protocol shortened by discontinuing reception of the related discovery signaling. Also, if the discovery IDs of the indicated devices are obtained by a device before the expiration of a configured discovery timer, UE 116 can terminate the discovery signaling and preserve processing and transmit power resources. The amount of storage and processing resources can be minimized through configuring only those resources needed for the indicated number of devices to discover.

In a second alternative (ID Alt. 2) Blind discovery configuration:

ID Alt 2-1: The discovery IDs are not explicitly signaled by eNB 103, and instead a number $N_d$ of devices to be discovered by UE 116 is indicated in the message. Indicating the number of devices facilitates a "blind" discovery protocol. A blind discovery protocol allows many devices to perform discovery even if their discovery IDs are not known beforehand. This approach is beneficial in a scenario where the network is not currently aware of which devices may be within a feasible discovery range of the targeted UE either because eNB 103 or network does not track that information or its currently stored proximity information is determined to be out-of-date. However, the network can limit the device to discovery with only a few devices (the $N_d$ closest for example) due to power efficiency or data resource scheduling and bandwidth constraints. Once $N_d$ devices have been discovered, UE 116 can discontinue discovery signaling and/or reception. It may also be beneficial in the scenario where all or some of the devices within discovery range of the targeted device are not currently connected to eNB 103.

ID Alt. 2-2: the discovery IDs are not explicitly signaled by eNB 103, and instead a range of discovery IDs that can be discovered by UE 116 is indicated in the message. The range of discovery IDs that can be discovered by UE 116 can also be predefined in the standards specification, so in this case no indication in the message is required. For example: Discovery IDs 1024-2048 can be reserved for the network for OOC devices, such as UE 114, to choose from as part of ad-hoc discovery. This range or an index corresponding to a set of ranges may be indicated to UE 116 to facilitate its discovery procedure.

Additionally, the DSM can include parameters related to the process in block 1120 that concerns the protocol for OOC UEs to become synchronized with the IC UEs and the network. The details are discussed herein below with respect to block 1120 and are summarized in Table 13.

In summary, the DSM can include at least one of the following fields:
Discovery setup type
Discovery configuration index
Transmit power
Discovery sequence length
Discovery timer
Number of devices to discover
Device IDs to discover
Device ID range
Total number of DRBs (N)
Total number of DRSs(T)
DRB/DRS maps
Sync Signal Indication
VCID
Sync Signal Configuration Index An example of a configured DSM is given in Table 13 based on the previously described parameters:

TABLE 7

Example DSM format #1

| Field | Description |
|---|---|
| Discovery Setup Type | |
| 0 | Indicates "blind discovery" |
| 1 | Indicates "targeted discovery" |
| Discovery Configuration Index | |
| 0-7 | See Table 5 |
| Number of indicated discovery IDs $N_d$ (optional - for Alt 2-1 blind discovery) | |
| 1-8 | Gives the size of the Discovery ID fields |
| Discovery IDs (optional - for Alt 1 targeted discovery) | |
| Up to 8 10-bit values | Indicate 8 unique IDs (out of 2048 possible) |
| Discovery ID range (optional - for Alt 2-2 blind discovery) | |
| 0-2048 | Indicates range of valid discovery IDs |

TABLE 7-continued

| Example DSM format #1 | |
|---|---|
| Field | Description |
| Total number of DRBs (N) - optional | |
| 1-100 | Indicates maximum number of DRBs per discovery period |
| Total number of DRSs (T) - optional | |
| 1-100 | Indicates maximum number of DRSs per discovery period |
| DRB/DRS maps | |
| bitmap A | 0 or 1 indicates whether or not the corresponding DRB or DRS is utilized for discovery |
| bitmap B | |
| Sync Signal Indication | |
| 0 or 1 | Indicates if UE transmitted sync signal is configured (0-off, 1-on) |
| VCID (optional) | |
| 0-503 | Indicates the virtual cell ID to generate the synchronization signal |
| Sync Signal Configuration Index (optional) | |
| 0-3 | Indicates time/frequency/power parameters/sync signal sequence ID to use as part of ad-hoc discovery |

Another example of a configured DSM is given in Table 14 wherein previously described parameters mapped to a discovery configuration index are configured by separate fields in the DSM:

TABLE 14

| Example DSM format #2 | |
|---|---|
| Field | Description |
| Discovery Setup Type | |
| 0 | Indicates "blind discovery" |
| 1 | Indicates "targeted discovery" |
| Transmit Power | |
| 0-3 | Indicates Tx Pwr Config. to use for discovery |
| Discovery sequence length | |
| {4, 8, 16, 32, 64} | Indicates the number of symbols or slots used in discovery Tx/Rx |
| Discovery Timer | |
| 0-100 ms | Indicates maximum length of discovery period |
| Number of indicated discovery IDs $N_d$ (optional - for Alt 2-1 blind discovery) | |
| 1-8 | Gives the size of the Discovery ID fields |
| Discovery IDs (optional - for Alt 1 targeted discovery) | |
| Up to 8 8-bit values | Indicate 8 unique IDs (out of 256 possible) |
| Discovery ID range (optional - for Alt 2-2 blind discovery) | |
| 0-2048 | Indicates range of valid discovery IDs |
| Total number of DRBs (N) - optional | |
| 1-100 | Indicates maximum number of DRBs per discovery period |
| Total number of DRSs (T) - optional | |
| 1-100 | Indicates maximum number of DRSs per discovery period |
| DRB/DRS maps | |
| bitmap A | 0 or 1 indicates whether or not the corresponding DRB or DRS is utilized for discovery |
| bitmap B | |
| Sync Signal Indication | |
| 0 or 1 | Indicates if UE transmitted sync signal is configured (0-off, 1-on) |

TABLE 14-continued

Example DSM format #2

| Field | Description |
|---|---|
| VCID (optional) | |
| 0-503 | Indicates the virtual cell ID to generate the synchronization signal |
| Sync Signal Configuration Index (optional) | |
| 0-3 | Indicates time/frequency/power parameters/sync signal sequence ID to use as part of ad-hoc discovery |

Sync signal indication, VCID, sync signal configuration index are discussed in further detail here below.

It is noted that another format of the DSM can straightforwardly be constructed similarly as Tables 13 and 14, by down-selecting fields out of the fields in Tables 13 or 14.

One important aspect of a network-assisted discovery protocol is the ability to inform eNB 103 regarding the success or failure the discovery protocol and providing feedback with regard to parameters relevant for future device discovery configurations. A discovery report message may be configured by eNB 103 or network and indicated to UE 116 in the DSM. The report message configuration can include an indication of the time/frequency resources to be utilized for the report transmission as well as an indication of relevant statistics or other information to be included in the report. The information elements to be included in the report may include the total elapsed discovery time, received signal power of discovery beacons or signal, channel quality measurements or estimates, relative or exact location information, detected discovery IDs, and any higher layer context information which may be exchanged as part of the discovery process. Additionally the discovery report configuration may also indicate which device(s) will transmit the discovery report for a given discovery period.

After the DSM is determined by eNB 103, eNB 103 transmits the DSM via a downlink signaling, which may be configured on a periodic or aperiodic basis.

In certain embodiments, the DSM is signaled to UEs via dedicated L1/MAC/RRC signaling. In the case of MAC/RRC signaling, a DCI configuring the PDSCH to carry the DSM is transmitted to UE 116 in a UE-specific search space of PDCCH/ePDCCH. In this case the CCEs/eCCEs for the different UEs are orthogonal. In the case of L1 signaling, the DCI directly contains the DSM information.

In certain embodiments, the DSM is signaled to UEs via common/broadcast signaling (e.g. in one of the existing or new System Information Block (SIB) messages). A DCI configuring the PDSCH to carry the DSM is transmitted to UE 116 in a common search space of PDCCH/ePDCCH. In the case where multiple UEs are engaged in discovery with the same set or subset of UEs, redundancy can be removed and decoding complexity reduced as the DSMs are multicast to the UEs in the same downlink resources.

In certain embodiments, in a hybrid combination of dedicated L1/MAC/RRC signaling and common/broadcast signaling, wherein certain parts of the DSM are transmitted in a UE-specific manner, and other parts of the message are multicast as a common control message.

Example 1

The discovery setup type and discovery configuration index fields can be multicast to all UEs if eNB 103 determines that these parameters are shared in common. However the number of indicated discovery IDs, the discovery IDs are transmitted in a UE specific manner since eNB 103 may restrict devices to only discover a subset of all the devices participating in the discovery period. Additionally, the DRB/DRBG mappings are transmitted in a UE-specific manner since they may be orthogonally assigned to each UE.

Example 2

Same as Example 1, except the number of Discovery IDs and the Discovery IDs are transmitted as part of the common DSM instead of on a UE-specific basis. This may be beneficial to reduce DSM overhead if a large number of devices are to engage in discovery without restriction.

In block 1120, Synchronization is performed. For example, UE2 acquires timing synchronization with UE1.

In the example shown in FIG. 10 in which one of the devices is outside of the coverage of the network, timing synchronization must first be ensured so that the control and discovery signaling can be properly transmitted and received by in-coverage (IC) and out-of-coverage (OOC) devices. For example, if UE 114 is outside of network coverage and eNB 103 signals to UE 116 to engage in discovery, UE 114 would need to know both when UE 116 is transmitting its discovery signal and when UE 116 would be listening to receive the discovery signal from UE 114. This requires at a minimum that UE 114 knows the OFDM symbol timing (CP length), sub-frame boundary, and sub-frame indexes as well as propagation delay between UE 116 and UE 114 to properly configure timing advance parameters. Since the network is not initially aware of the OOC devices and further even if aware, may not be able to communicate with the OOC devices, the protocol allows the IC UE (UE 116) to manage the setup of synchronization between the IC and OOC devices and relay relevant control messages from UE 114 to eNB 103.

Several alternatives for achieving timing synchronization between UE 116 and UE 114 are considered below:

In a first alternative (TS Alt. 1): UE 116 transmits a periodic synchronous signal (denoted as a D2D sync signal) based upon the primary synchronization signals and secondary synchronization signals (PSS/SSS) transmitted by eNB 103.

The time/frequency location of the PSS/SSS transmitted by UE 116 can be identical to that of the serving eNB's or different. In case they are the same, UE 116 repeats the PSS/SSS of eNB 103 just like a repeater; eNB 103's PSS/SSS are amplified by the UB 116's repetition, which helps UE 114 to acquire sync of eNB 103. In case they are different, UE 116 transmits its D2D sync signal (PSS/SSS) in the orthogonal resources than the eNB's PSS/SSS; this ensures that the D2D sync signal does not interfere with the signal from eNB 103. Some example ways of determining the time frequency resources for the D2D PSS/SSS are:

a) Identical to the signal transmitted by eNB 103 serving UE 116. That is, it is transmitted in the same sub-frames and uses the same set of resource elements as eNB 103. For example, for an FDD system, the PSS and SSS are transmitted in the central six resource blocks of the downlink bandwidth during sub-frames 0 and 5.

b) Identical to the signal transmitted by eNB 103, except for the frequency location. For example, for an FDD system, the PSS and SSS are transmitted in the central six resource blocks of the uplink bandwidth during sub-frames 0 and 5.

c) Identical to the signal transmitted by eNB 103, except for the time location. This can include both transmitting the PSS/SSS signal on different sub-frames than the serving eNB and transmitting on the same sub-frames as the serving eNB but with a different periodicity. For example, for an FDD system, the PSS and SSS are transmitted in the central six resource blocks of the uplink bandwidth during sub-frames 1 and 6 every $5^{th}$ radio frame.

d) Combination of Alt. b) (Identical to the signal transmitted by eNB 103 except for the frequency location) and Alt. c) (Identical to the signal transmitted by eNB 103, except for the time location).

It is noted that a virtual cell ID can be configured for the PSS/SSS, in which case the virtual cell ID replaces the physical cell ID for generating the D2D PSS/SSS sequences.

In a second alternative (TS Alt. 2), UE 116 transmits a compact periodic synchronous signal that has a short duration and long periodicity and may cover the entire uplink or downlink bandwidth. The configuration of the sync signal and related parameters can be indicated to UE 116 via a UE-specific or cell-specific control message, such as part of the DSM. The sync signal configuration can indicate at least one or all of the following parameters:

1 Time/frequency resource blocks utilized for the sync signal transmission indicate:
 a. By explicitly giving the mapping of the RBs, for example via a bitmap.
 b. By an index indicating a selection from a set pre-configured RB mappings
2. Power control parameters for sync signal transmission
3. VCID to determine the PSS/SSS sequences
Examples of the range of the VCID may be:
 a. [0, 503], corresponding to the range of the VCID used by the PSS/SSS transmitted by the eNB.
 b. [0,X], where X is pre-configured or given by RRC configuration.
 c. [X,Y], where X and Y are pre-configured or given by RRC configuration.

Once UE 114 has acquired the sync signal of UE 116, UE 114 is able to directly determine the sub-frame timing of the network. If the discovery period parameters of the network were previously known at UE 114 by a previous network connection, or if they are fixed and preconfigured, UE 114 can directly participate in the discovery protocol. However, if these parameters are not known at UE 114 (for example if UE 114 has just powered-on) or if they are semi-statically configured and UE 114 cannot determine if previously acquired parameters are still valid, a method needs to be defined for UE 114 to receive the relevant parameters. The following are an exemplary set of parameters that can be needed by UE 114:

1. Bandwidth (number and position of RB) utilized by discovery resource blocks
2. Frame number (for discovery timer)
3. Subframe indices (or relative period) of the discovery subframes
4. Discovery ID seed (ex. eNB physical cell ID (PCI), or the VCID)
5. Power control parameters for UE2

UE 116 transmits a configuration message to UE 114 to configure at least one of the parameters described above. Two alternatives of conveying this configuration message are described below:

In a first alternative (CM Alt 1), these or other parameters are transmitted by UE 116 to UE 114 in a Discovery System Information Block (DSIB). The timing of the DSIB is a fixed pattern of sub-frames (such as, every 100 sub-frames) so that UE 114 can autonomously look for and receive the DSIB after successfully performing synchronization using the sync signal from UE 116. In certain embodiments, the time/frequency symbols used for DSIB transmission are known by UE 114 due to pre-configuration. An example format is given by Table 15 below:

TABLE 15

Example DSIB format #1

| Field | Description |
| --- | --- |
| Discovery Setup Type | |
| 0 | Indicates "blind discovery" |
| 1 | Indicates "targeted discovery" |
| Discovery Configuration Index | |
| 0-7 Number of indicated discovery IDs $N_d$(optional) | See Table 5 |
| 1-8 Discovery IDs (optional) | Gives the size of the Discovery ID fields |
| Up to 8 8-bit values Discovery ID range (optional) | Indicate 8 unique IDs (out of 256 possible) |
| 0-2048 Discovery Subframe Indices and Period (optional) | Indicates range of valid discovery IDs |
| 0-9, 1-80 Total number of DRBs (N) - optional | Indicates starting subframe (n), and period (relative to n) of discovery subframes |
| 1-100 Total number of DRSs (T) - optional | Indicates maximum number of DRBs per discovery period |
| 1-100 DRB/DRS map (optional) | Indicates maximum number of DRSs per discovery period |
| bitmap A bitmap B Frame Number (optional) | 1 or 0 indicates whether or not the corresponding DRB or DRS is utilized for discovery |
| 16 bits Discovery ID seed (optional) | Indicates current system frame number (SFN) |
| 10 bits | Indicates the seed (ex. VCID or PCI) to be used as a part of discovery ID generation |

Another example of a DSIB format is given in Table 16, wherein previously described parameters mapped to a discovery configuration index are configured by separate fields in the DSIB:

TABLE 16

Example DSIB format #2

| Field | Description |
|---|---|
| Discovery Setup Type | |
| 0 | Indicates "blind discovery" |
| 1 | Indicates "targeted discovery" |
| Transmit Power | |
| 0-3 | Indicates Tx Pwr Config. to use for discovery |
| Discovery sequence length | |
| {4, 8, 16, 32, 64} | Indicates the number of symbols or slots used in discovery Tx/Rx |
| Discovery Timer | |
| 0-100 ms | Indicates maximum discovery period length |
| Number of indicated discovery IDs $N_d$ (optional) | |
| 1-8 | Gives the size of the discovery ID fields |
| Discovery IDs (optional) | |
| Up to 8 10-bit values | Indicate 8 unique IDs (out of 2048 possible) |
| Discovery ID range (optional) | |
| 0-2048 | Indicates range of valid discovery IDs |
| Discovery Subframe Indices and Period (optional) | |
| 0-9, 1-80 | Indicates starting subframe (n), and period (relative to n) of discovery subframes |
| Total number of DRBs (N) - optional | |
| 1-100 | Indicates maximum number of DRBs per discovery period |
| Total number of DRSs (T) - optional | |
| 1-100 | Indicates maximum number of DRSs per discovery period |
| DRB/DRS map (optional) | |
| bitmap A bitmap B | 1 or 0 indicates whether or not the corresponding DRB or DRS is utilized for discovery |
| Frame Number (optional) | |
| 16 bits | Indicates current system frame number (SFN) |
| Discovery ID seed (optional) | |
| 10 bits | Indicates the seed (ex. VCID or PCI) to be used as a part of discovery ID generation |

It is noted that another format of the DSIB can straightforwardly be constructed similarly as Tables 15 and 16, by down-selecting fields out of the fields in Table 15 or 16.

In a second alternative (CM Alt 2), the discovery resource configuration can be implicitly derived by UE 114 through a mapping of the VCID transmitted by UE 116 as part of the sync signal transmission (for example the VCID may have a one-to-one mapping to the pseudo-random sequence for the PSS/SSS). For example, VCID's 496-503 are reserved for sync signal transmissions, which are one-to-one mapped to eight different discovery configurations (see Table 11, Table 12 and Table 13). If UE 116 transmits its sync signal using VCID 500, UE 114 implicitly understands to use the configuration with index 4.

In block 1125, UE 114 and UE 116 engage in a device discovery method based on the received discovery setup information. Thereafter, in block 1130, an outcome of the discovery process is determined. For example, at the conclusion of discovery phase, UE 116 and UE 116 and determine the outcome of the discovery process. This can include determining whether unique device identifiers (this identifier may be the same as the discovery ID) are received, measurement of physical layer parameters including estimates of channel quality between the detected devices, and relative or exact location information. Furthermore, messaging can be included as part of the discovery procedure, wherein devices exchange higher layer information including data buffer status, QoS level, device capabilities, active applications, and user context. These higher layer parameters also can be used to determine if the discovery process is successful besides physical layer thresholds.

The status of each discovery attempt can be indicated to the network by UE 116 via bitmap. A bit value of zero in the $i^{th}$ bit indicates that the discovery attempt corresponding to the $i^{th}$ discovery ID as configured by the discovery setup was not successful. The number of bits in the discovery resource configuration bitmap is $N_d$. The bitmap B forms the bit sequence $b_{Nd-1}, \ldots, b_3, b_2, b_2, b_1, b_0$ where $b_0$ is the least significant bit (LSB) and $b_{N-1}$ is the most significant bit (MSB).

IN block 1135, success or failure is determined. Upon determination of successful or failed device discovery, a discovery report message is transmitted to the network by UE1 via an uplink control channel. An example of the discovery report message format is given by Table 17:

TABLE 17

Discovery report message format

| Field | Description |
|---|---|
| Targeted Discovery Result (optional) | |
| Bitmap B | $b_i$ indicates whether or not the discovery signaling with the corresponding discovery ID succeeded |
| Blind Discovery Result | |
| $N_d$ 10-bit fields | Field values: Value of 0 indicates failed discovery Value of discovery ID if success |
| Channel quality # of measurements configured by $N_d$ | Provides estimate of channel quality for each of the discovery attempts |
| Est. relative locations # of measurements configured by $N_d$ | Provides estimate of relative location for each discovery ID |
| Discovery Time $0-T_{disc}$ | Indicates total time needed for discovery (up to maximum $T_{disc}$) |

Thereafter, in block 1140, databases are updated. Upon receipt of a discovery report eNB 103 or network uses the report to update its related D2D databases. The discovery report also can be used by eNB 103 or network to determine optimal or desired D2D communication resources for the discovered devices.

Thereafter, in block 1145, once the discovery protocol is completed the network or the UE devices can determine whether to proceed with a D2D communications protocol or in the case of discovery failure reinitiate a D2D discovery protocol.

Figure 13:
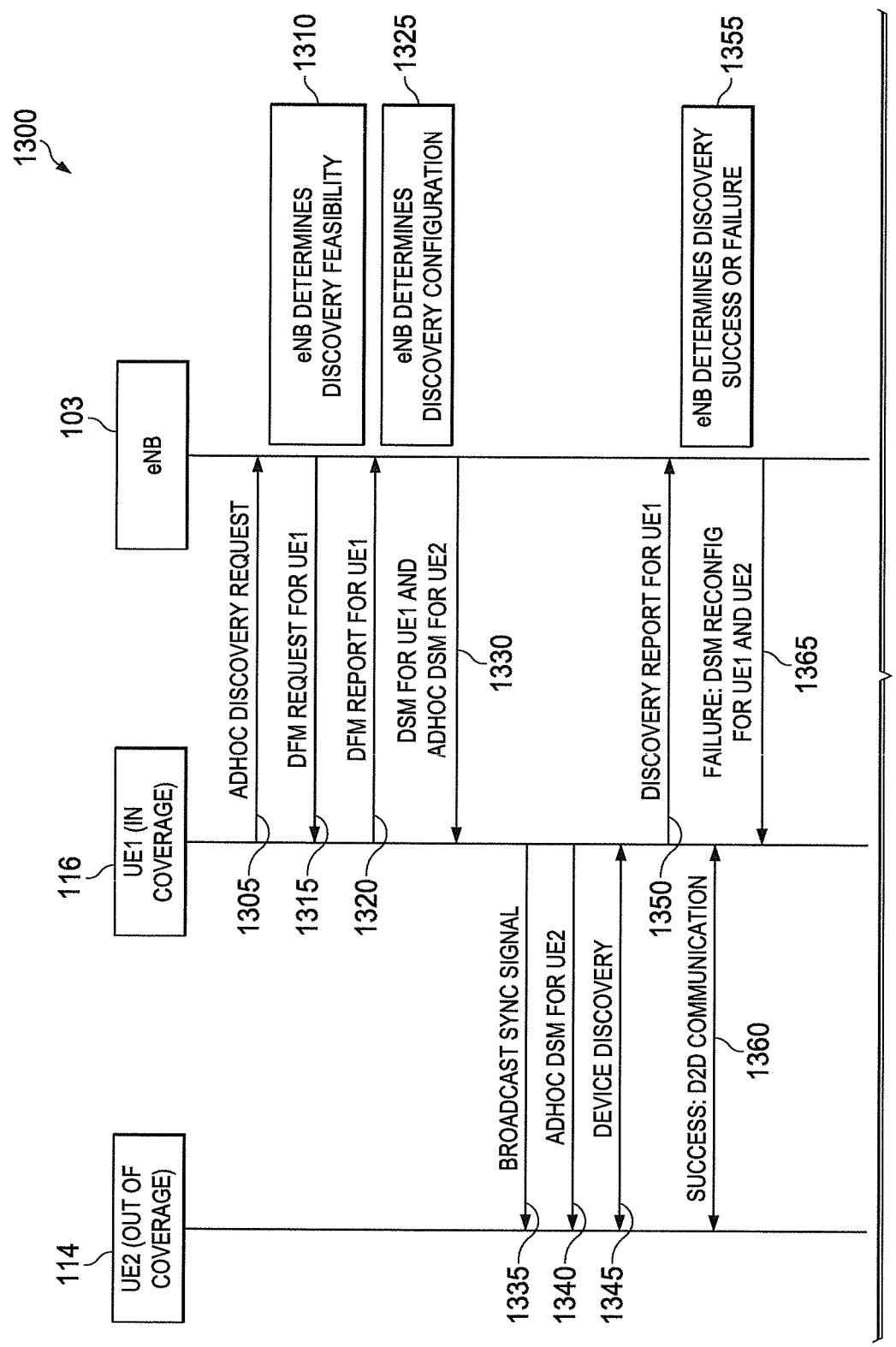
FIG. 13 illustrates a signaling flow of a hybrid ad-hoc D2D discovery protocol for when an OC device initiates the device discovery.

FIG. 13 illustrates a signaling flow of a hybrid ad-hoc D2D discovery protocol for when an OC device initiates the device discovery. The embodiment of the signaling flow 1300 shown in FIG. 13 is for illustration only. Other embodiments could be used without departing from the scope of the present disclosure.

UE 116 signals an Ad-hoc discovery request 1305 (if device initiated) to eNB 103. In response, eNB 103 determines discovery feasibility in block 1310 and sends a DFM 1315 to UE 116. In response UE 116 transmits a DFM report 1320 to eNB 103. Thereafter, eNB 103 determines a discovery configuration in block 1325 and sends a DSM for UE 116 and an Ad-hoc DSM 1330 for UE 114. In response, UE 116 transmits a broadcast sync signal 1335 and forwards the Ad-hoc DSM 1340 to UE 114. Thereafter, UE 114 and UE 116 perform device discovery 1345. UE 116 transmits a discovery report 1350 to eNB 103 indicating a success or failure of the device discovery. In response, eNB 103 determines whether device discovery was successful or not in block 1360. If device discovery was successful, UE 114 and UE 116 conduct D2D communications 1360. If device discovery was unsuccessful, eNB 103 sends a DSM reconfiguration message 1365 for UE 116 and UE 114

It can be also contemplated that various combinations or sub-combinations of the specific features and aspects of the embodiments may be made and still fall within the scope of the appended claims. For example, in some embodiments, the features, configurations, or other details disclosed or incorporated by reference herein with respect to some of the embodiments are combinable with other features, configurations, or details disclosed herein with respect to other embodiments to form new embodiments not explicitly disclosed herein. All of such embodiments having combinations of features and configurations are contemplated as being part of the present disclosure. Additionally, unless otherwise stated, no features or details of any of the embodiments disclosed herein are meant to be required or essential to any of the embodiments disclosed herein, unless explicitly described herein as being required or essential.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus of a user equipment (UE) in a wireless communication network, the apparatus comprising:
   a transceiver; and
   a processing circuitry operatively coupled with the transceiver, wherein the processing circuitry is configured to
      receive, from an evolved NodeB (eNB), a first message for device to device (D2D) discovery, the first message comprising information regarding a cell identifier (ID) on which generation of a UE synchronization signal for the D2D discovery is based,
      transmit, to another UE, a configuration message indicating a frame number of a subsequent frame in which the UE synchronization signal for the D2D discovery will be transmitted, and
      transmit, to the other UE, the UE synchronization signal for the D2D discovery generated based on the cell ID in the frame.

2. The apparatus as set forth in claim 1, wherein the first message further comprises at least one of a transmission power parameter for the D2D discovery and power control parameters for the D2D discovery.

3. The apparatus as set forth in claim 1, wherein the first message further comprises one or more of time resource blocks for transmitting the UE synchronization signal for the D2D discovery, frequency resource blocks for transmitting the UE synchronization signal for the D2D discovery, or power control parameters for transmitting the UE synchronization signal for the D2D discovery.

4. The apparatus as set forth in claim 1, wherein the first message comprises configuration of the UE synchronization signal for the D2D discovery, and wherein the cell ID identifies a cell of the eNB, is used by the other UE to detect asynchronous neighboring cells, and is used when the UE extends the UE synchronization signal for the D2D discovery beyond a coverage area of the cell.

5. The apparatus as set forth in claim 1, wherein the apparatus is configured to receive, from the eNB, primary synchronization signals and secondary synchronization signals, wherein the UE synchronization signal for the D2D discovery is generated based on the primary synchronization signals and the secondary synchronization signals.

6. The apparatus as set forth in claim 1, wherein the apparatus is configured to transmit, to the eNB, a second message comprising a first information, wherein the first information indicates a request for discovery.

7. A method of a user equipment (UE) in a wireless communication network, the method comprising:
receiving, from an evolved NodeB (eNB), a first message for device to device (D2D) discovery, the first message comprising information regarding a cell identifier (ID) on which generation of a UE synchronization signal for the D2D discovery is based;
transmitting, to another UE, a configuration message indicating a frame number of a subsequent frame in which the UE synchronization signal for the D2D discovery will be transmitted; and
transmitting, to the another UE, the UE synchronization signal for the D2D discovery generated based on the cell ID in the frame.

8. The method as set forth in claim 7, wherein the first message further comprises at least one of a transmission power parameter for the D2D discovery and power control parameters for the D2D discovery.

9. The method as set forth in claim 7, wherein the first message further comprises one or more of time resource blocks for transmitting the UE synchronization signal for the D2D discovery, frequency resource blocks for transmitting the UE synchronization signal for the D2D discovery, or power control parameters for transmitting the UE synchronization signal for the D2D discovery.

10. The method as set forth in claim 9, wherein the first message comprises configuration of the UE synchronization signal for the D2D discovery, and wherein the cell ID identifies a cell of the eNB, is used by the other UE to detect asynchronous neighboring cells, and is used when the UE extends the UE synchronization signal for the D2D discovery beyond a coverage area of the cell.

11. The method as set forth in claim 7, further comprising:
receiving, from the eNB, primary synchronization signals and secondary synchronization signals, wherein the UE synchronization signal for the D2D discovery is generated based on the primary synchronization signals and the secondary synchronization signals.

12. The method as set forth in claim 7, further comprising:
transmitting, to the eNB, a second message comprising a first information, wherein the first information indicates a request for discovery.

13. The apparatus as set forth in claim 1, wherein the configuration message comprises information indicating a subframe number of a subframe in which the UE synchronization signal for the D2D discovery is transmitted.

14. The apparatus as set forth in claim 1, wherein the configuration message comprises information indicating a number of resource blocks corresponding to a bandwidth to be configured for the other UE.

15. The apparatus as set forth in claim 1, wherein the first message for D2D discovery is received while at least one of the UE and the other UE is out of a network coverage.

16. The apparatus as set forth in claim 1, wherein the processing circuitry is configured to generate the UE synchronization signal for the D2D discovery based on the first message received from the eNB.

17. The apparatus as set forth in claim 1, wherein the processing circuitry is configured to generate the UE synchronization signal for the D2D discovery based on the cell ID, the cell ID corresponding to the eNB.

18. The method as set forth in claim 7, wherein the configuration message comprises information indicating a subframe number of a subframe in which the UE synchronization signal for the D2D discovery is transmitted.

19. The method as set forth in claim 7, wherein the configuration message comprises information indicating a number of resource blocks corresponding to a bandwidth to be configured for the other UE.

20. The method as set forth in claim 7, wherein the first message for D2D discovery is received while at least one of the UE and the other UE is out of a network coverage.

21. The method as set forth in claim 7, further comprising generating the UE synchronization signal for the D2D discovery based on the first message received from the eNB.

22. The method as set forth in claim 7, further comprising generating the UE synchronization signal for the D2D discovery based on the cell ID, the cell ID corresponding to the eNB.

* * * * *